United States Patent
Bauer et al.

(10) Patent No.: US 6,469,291 B2
(45) Date of Patent: *Oct. 22, 2002

(54) MOISTURE DETECTING SYSTEM USING SEMICONDUCTOR LIGHT SENSOR WITH INTEGRAL CHARGE COLLECTION

(75) Inventors: Fred T. Bauer; Jon H. Bechtel; Robert R. Turnbull, all of Holland, MI (US); Robert H. Nixon, Burbank; Eric R. Fossum, La Crescenta, both of CA (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/955,445

(22) Filed: Sep. 18, 2001

(65) Prior Publication Data

US 2002/0020804 A1 Feb. 21, 2002

Related U.S. Application Data

(63) Continuation of application No. 09/290,966, filed on Apr. 13, 1999, now Pat. No. 6,313,457, which is a continuation-in-part of application No. 09/237,107, filed on Jan. 25, 1999, now abandoned.

(51) Int. Cl.[7] ............................ H01J 40/14; H01L 31/00
(52) U.S. Cl. ............................ 250/214 C; 250/214.1; 250/215; 250/574; 318/483
(58) Field of Search .................. 250/214 R, 214 C, 250/214.1, 215, 573, 574; 340/602; 318/483; 327/514

(56) References Cited

U.S. PATENT DOCUMENTS

| 4,208,668 A | 6/1980 | Krimmel |
| 4,315,159 A | 2/1982 | Niwa et al. |
| 4,355,271 A | 10/1982 | Noack |
| 4,465,370 A | 8/1984 | Yuasa et al. |
| 4,620,141 A | 10/1986 | McCumber et al. |
| 4,652,745 A | 3/1987 | Zanardelli |
| 4,669,826 A | 6/1987 | Itoh et al. |
| 4,678,938 A | 7/1987 | Nakamura |
| 4,690,508 A | 9/1987 | Jacob |
| 4,697,883 A | 10/1987 | Suzuki et al. |
| 4,798,956 A | 1/1989 | Hochstein |
| 4,799,768 A | 1/1989 | Gahan |
| 4,819,071 A | 4/1989 | Nakamura |
| 4,859,867 A | 8/1989 | Larson et al. |
| 4,867,561 A | 9/1989 | Fujii et al. |
| 4,871,917 A | 10/1989 | O'Farrell et al. |

(List continued on next page.)

FOREIGN PATENT DOCUMENTS

| DE | 2946561 | 5/1981 |
| DE | 4424454 | 1/1996 |
| DE | 19526249 | 2/1996 |

(List continued on next page.)

OTHER PUBLICATIONS

Patent Abstract of Japanese Publication No. 59199347, published Nov. 12, 1984, entitled Wiper Controller for Vehicle.

Primary Examiner—F. L. Evans
(74) Attorney, Agent, or Firm—Price, Heneveld, Cooper, DeWitt & Litton

(57) ABSTRACT

Moisture detection permits moisture removal equipment, such as automotive windshield wipers and defogger systems, to be operated automatically. A system for detecting moisture on a surface includes a light emitter directed at the surface. The presence of moisture is based on the intensity of light from the emitter reflected by the surface and received by a light sensor. The light sensor accumulates charge in response to incident light over a variable integration period.

11 Claims, 18 Drawing Sheets

U.S. PATENT DOCUMENTS

| | | |
|---|---|---|
| 4,916,307 A | 4/1990 | Nishibe et al. |
| 4,916,374 A | 4/1990 | Schierbeek et al. |
| 4,930,742 A | 6/1990 | Schofield et al. |
| 4,956,591 A | 9/1990 | Schierbeek et al. |
| 4,960,996 A | 10/1990 | Hochstein |
| 4,973,844 A | 11/1990 | O'Farrell et al. |
| 4,987,354 A | 1/1991 | Steinmann |
| 5,036,437 A | 7/1991 | Macks |
| 5,204,778 A | 4/1993 | Bechtel |
| 5,214,274 A | 5/1993 | Yang |
| 5,235,178 A | 8/1993 | Hegyi |
| 5,243,215 A | 9/1993 | Enomoto et al. |
| 5,276,389 A | 1/1994 | Levers |
| 5,306,992 A | 4/1994 | Dröge |
| 5,313,072 A | 5/1994 | Vachss |
| 5,338,691 A | 8/1994 | Enomoto et al. |
| 5,386,111 A | 1/1995 | Zimmerman |
| 5,386,128 A | 1/1995 | Fossum et al. |
| 5,410,455 A | 4/1995 | Hashimoto |
| 5,416,318 A | 5/1995 | Hegyi |
| 5,426,294 A | 6/1995 | Kobayashi et al. |
| 5,451,822 A | 9/1995 | Bechtel et al. |
| 5,471,515 A | 11/1995 | Fossum et al. |
| 5,483,346 A | 1/1996 | Butzer |
| 5,488,416 A | 1/1996 | Kyuma |
| 5,498,866 A | 3/1996 | Bendicks et al. |
| 5,550,677 A | 8/1996 | Schofield et al. |
| 5,581,240 A | 12/1996 | Egger |
| 5,598,146 A | 1/1997 | Schröder |
| 5,625,210 A | 4/1997 | Lee et al. |
| 5,644,418 A | 7/1997 | Woodward |
| 5,659,294 A | 8/1997 | Schröder |
| 5,661,303 A | 8/1997 | Teder |
| 5,663,542 A | 9/1997 | Kohr et al. |
| 5,666,028 A | 9/1997 | Bechtel et al. |
| 5,712,685 A | 1/1998 | Dumas |
| RE35,762 E | 4/1998 | Zimmerman |
| 5,760,962 A | 6/1998 | Schofield et al. |
| 5,789,737 A | 8/1998 | Street |
| 5,796,094 A | 8/1998 | Schofield et al. |
| 5,796,106 A | 8/1998 | Noack |
| 5,808,350 A | 9/1998 | Jack et al. |
| 5,811,793 A | 9/1998 | Pientka |
| 5,818,600 A | 10/1998 | Bendicks et al. |
| 5,821,863 A | 10/1998 | Schröder et al. |
| 5,841,126 A | 11/1998 | Fossum et al. |
| 5,841,159 A | 11/1998 | Lee et al. |
| 5,872,437 A | 2/1999 | Pientka et al. |
| 5,904,493 A | 5/1999 | Lee et al. |
| 5,923,027 A * | 7/1999 | Stam et al. ............... 250/208.1 |
| 6,008,486 A | 12/1999 | Stam et al. |
| 6,027,955 A | 2/2000 | Lee et al. |
| 6,313,457 B1 * | 11/2001 | Bauer et al. ............ 250/214 C |
| 6,323,477 B1 | 11/2001 | Blasing et al. |

FOREIGN PATENT DOCUMENTS

| | | |
|---|---|---|
| EP | 0479169 | 4/1992 |
| EP | 0675345 | 3/1995 |
| EP | 0711683 | 5/1996 |
| EP | 0869032 | 10/1998 |
| GB | 2056059 | 3/1981 |
| JP | 62-278435 A * | 12/1987 |
| JP | 9-126998 | 5/1997 |
| WO | 9427262 | 11/1994 |
| WO | 9501561 | 1/1995 |
| WO | 9735743 | 10/1997 |
| WO | 9923828 | 5/1999 |
| WO | 9947396 | 9/1999 |

* cited by examiner

MOISTURE DETECTING SYSTEM USING SEMICONDUCTOR LIGHT SENSOR WITH INTEGRAL CHARGE COLLECTION

CROSS-REFERENCE TO RELATED APPLICATIONS

This application is a continuation of U.S. patent application Ser. No. 09/290,966 filed on Apr. 13,1999, entitled "MOISTURE DETECTING SYSTEM USING SEMICONDUCTOR LIGHT SENSOR WITH INTEGRAL CHARGE COLLECTION," now U.S. Pat. No. 6,313,457, which is a continuation-in-part of U.S. patent application Ser. No. 09/237,107 filed on Jan. 25, 1999, entitled "PHOTODIODE LIGHT SENSOR," now abandoned, the specifications of which are incorporated herein by reference in their entirety.

TECHNICAL FIELD

The present invention relates to sensors for detecting moisture on a surface, such as an automobile windshield, by detecting modifications in light intensity caused by the presence of the moisture.

BACKGROUND ART

Automatically detecting the presence of moisture on a surface has many applications. In particular, the ability to detect moisture on an automotive vehicle windshield frees the vehicle operator from the distraction of having to locate controls, such as wipers and defoggers, when driving conditions change. Windshield moisture can occur as rain, snow, ice, frost, fog, and the like on the windshield outer surface. Moisture may also occur as frost or fog on the windshield inner surface.

Many proposed systems for detecting moisture on a window are based on changes in the reflectivity or transmissivity of the window due to the presence of moisture. Generally, one or more light emitters are aimed at the window inner surface. One or more light sensors are positioned to receive light from the emitters reflected by the window. In one design, emitted light passes through the window when moisture is not present, but is reflected to a light sensor when moisture exists on the inner or outer window surface. In another design, emitted light is coupled into the window at an angle conducive to total internal reflectance when no moisture is present. One or more light sensors are coupled to the window so as to extract light after several internal reflections. The presence of moisture on a window surface degrades the internal reflection, decreasing the amount of light received by the light sensor. In either design, ambient light presents a source of noise that must be compensated for or reduced.

A key element in the design of such moisture detecting systems is the type of light sensor used. This is particularly true in automotive vehicles where the operating environment is severe and cost is a limiting factor. Light sensors must operate within the ranges of temperature, humidity, shock, and vibration experienced within a vehicle passenger compartment. Sensors and support electronics must be inexpensive to allow the cost of automatic equipment, such as windshield wipers and defogger systems, to fall within the range deemed acceptable by an automobile purchaser. The sensor should have sufficient sensitivity across a wide dynamic range. Light transducers within the sensor should have good noise immunity or be compatible with noise compensation electronics within the sensor for sensitivity at low light levels. As a final desirable characteristic, the sensor must be easily integratable into the types of digital control systems commonly found in automotive applications.

One type of light transducer is the cadmium sulfide (CdS) cell. CdS cells are photosensitive resistors exhibiting increasing conductance with increasing light levels. CdS cells have the advantage of being low in cost and having good sensitivity to low light levels. Disadvantages with CdS cells include a high degree of variance between cells, slow response at low light levels, poor environmental stability, and difficulty being assembled by automated electronic manufacturing equipment.

Another type of light transducer used in moisture detecting systems is the discrete photodiode configured as a light-dependent current source. Photodiodes have less variance between parts, better environmental stability, and are more easily adapted to automated manufacturing than are CdS cells. However, photodiodes tend to be expensive and produce very low currents at low light levels. These low currents require special amplification techniques to achieve a useful signal, increasing the cost of moisture detection.

Yet another type of light sensor is the phototransistor. The phototransistor functions as a light sensitive amplifier. Light incident on the base generates current which regulates the flow of collector current. Phototransistors are more sensitive than photodiodes but exhibit less stability.

A relatively new type of light sensor incorporates a silicon-based light transducer and conditioning electronics on a single substrate. The light transducer generates charge at a rate proportional to the amount of incident light. This light-induced charge is collected over an integration period. The resulting potential indicates the level of light to which the sensor is exposed over the integration period. Light sensors with integral charge collection have many advantages. By varying the integration time, the sensor dynamic range is greatly extended. Also, the ability to incorporate additional electronics on the same substrate as the transducer increases noise immunity and permits the sensor output to be formatted for use by a digital circuit. Component integration additionally reduces the system cost. Silicon devices are more temperature invariant than CdS cells and can be packaged to provide the necessary protection from humidity, shock, and vibration. Types of charge accumulating light transducers include photodiodes and photogate transistors. A variety of charge integrating photodiode devices have been described including those in U.S. Pat. No. 4,916,307 to Nishibe et al.; U.S. Pat. No. 5,214,274 to Yang; U.S. Pat. No. 5,243,215 to Enomoto et al.; U.S. Pat. No. 5,338,691 to Enomoto et al.; and U.S. Pat. No. 5,789,737 to Street. Photogate transistor devices are described in U.S. Pat. No. 5,386,128 to Fossum et al. and U.S. Pat. No. 5,471,515 to Fossum et al. Each of these patents is herein incorporated by reference.

One difficulty with all types of light sensors is the occurrence of operating anomalies at high temperatures. Some devices become extremely non-linear at high temperatures. Some devices, such as CdS cells, may suffer a permanent change in operating characteristics. Devices may even provide completely false readings such as indicating bright light in low light conditions due to excessive thermal noise. Traditionally, the only way to deal with this problem has been to incorporate a temperature sensor and associated electronics into the moisture detecting system.

What is needed is a moisture detecting system that derives the benefits provided by semiconductor light sensors with integral charge collection. The moisture detecting system should be economical to produce, operate over a wide range of lighting conditions, and be less susceptible to temperature variations.

DISCLOSURE OF INVENTION

It is an object of the present invention to detect moisture over a wide range of lighting conditions.

Another object of the present invention is to detect moisture utilizing a charge integrating semiconductor light sensor.

Still another object of the present invention is to detect moisture with less susceptibility to temperature variations.

Yet another object of the present invention is to provide a moisture detector that is inexpensive to produce.

A further object of the present invention is to provide a moisture detector capable of detecting a variety of moisture types.

In carrying out the above objects and other objects and features of the present invention, a system for detecting moisture on a surface is provided. A light emitter is directed at the surface. Detecting the presence of moisture is based on the intensity of light from the emitter received by a light sensor. The light sensor accumulates charge in response to incident light over a variable integration period.

A system is also provided for detecting moisture on a window having an inner surface and an outer surface. The system includes an emitter operative to emit light at the window. A light sensor receives light reflected from the outer surface, the level of reflected light indicative of moisture on the outer surface. The light sensor outputs a discrete light signal based on the level of incident light over an integration period. Control logic receives a first light signal from the light sensor with the emitter turned off. The emitter is turned on. A second light signal is received from the light sensor. The presence of moisture is determined based on the first light signal and the second light signal.

In an embodiment of the present invention, the light sensor has an input for receiving a light integration period signal specifying the light integration period. The control logic determines a light integration period based on at least one previously received first light signal and outputs the light integration period signal based on the determined light integration period. In an alternative embodiment, each light signal is a pulse having a pulse width indicative of the incident light level. The control logic generates a sequence of integration period signals, each integration period signal in the sequence specifying a different light integration period, and determines the light level based on a resulting light signal having a pulse width within at least one preset width threshold.

In another embodiment of the present invention, the light sensor includes an exposed light transducer accumulating charge in proportion to light incident over the light integration period. Sensor logic determines the light integration period prior to beginning integration. The charge accumulated in the exposed light transducer is reset at the beginning of the light integration period. The charge accumulated by the exposed light transducer over the light integration period is measured. A pulse having a width based on the accumulated charge is then output.

In still another embodiment of the present invention, the light sensor further includes a light transducer shielded from light which accumulates charge in proportion to noise over the integration period. The sensor logic resets the charge accumulated in the shielded light transducer at the beginning of the light integration period, measures the charge accumulated by the shielded light transducer over the light integration period, and outputs a pulse having a width based on the difference between the accumulated exposed light transducer charge and the accumulated shielded light transducer charge.

In yet another embodiment of the present invention, the light sensor receives an integration pulse, the width of the integration pulse determining the integration period, and generates the output pulse after the integration pulse. The difference in time between the end of the integration pulse and the start of the output pulse indicates the amount of thermal noise in the light sensor. In a refinement, the control logic determines the amount of time between the end of the integration pulse and the start of the output pulse and determines the light sensor temperature based on the determined time. In yet a further refinement, the control logic disables moisture detection if the light sensor temperature exceeds a preset limit.

In a further embodiment of the present invention, the light sensor includes an enclosure having a window for receiving light. The enclosure admits a power pin, a ground pin, and a signal pin. An exposed light transducer within the enclosure accumulates charge in proportion to incident light received through the window. A light-to-pulse circuit within the enclosure outputs an output pulse having a width based on charge accumulated by the exposed light transducer over an integration period. Sensor logic within the enclosure receives an integration pulse on the signal pin, determines the integration period based on the width of the integration pulse, and outputs the output pulse on the signal pin. Control logic has a signal pin connected to the signal pin of the light sensor. The control logic sets the control logic signal pin to output mode, determines an integration period, generates an integration pulse on the control logic signal pin having a width based on the integration period, sets the control logic signal pin to input mode, receives the light sensor output pulse, and determines a light level received by the light sensor based on the light sensor output pulse.

In a still further embodiment of the present invention, the moisture detecting system includes a second light sensor receiving light reflected from the inner surface. The control logic receives a third light signal from the second light sensor with the emitter turned off, turns on the emitter, receives a fourth light signal from the second light sensor, and determines the presence of moisture on the inner surface based on the third light signal and the fourth light signal.

A method for determining the presence of moisture on a window is also provided. A light emitter directed at the window is activated. An integration period for a light sensor positioned to receive light from the emitter reflected off the window is determined. The intensity of light incident on the light sensor over the integration period is determined. The presence of moisture is determined based on the intensity of the incident light. In refinements, determining the integration period for the light sensor and determining the presence of moisture are based on the ambient light level.

In an embodiment of the present invention, the method includes determining the ambient light level by deactivating the light emitter, determining an ambient light integration period for the light sensor, determining the intensity of light incident on the light sensor over the ambient light integration period, and determining an ambient light level based on the intensity of incident light with the light emitter deactivated.

The above objects and other objects, features, and advantages of the present invention are readily apparent from the following detailed description of the best mode for carrying H e invention when taken in connection with the accompanying drawings.

BEST MODE FOR CARRYING OUT THE INVENTION

Figure 1:
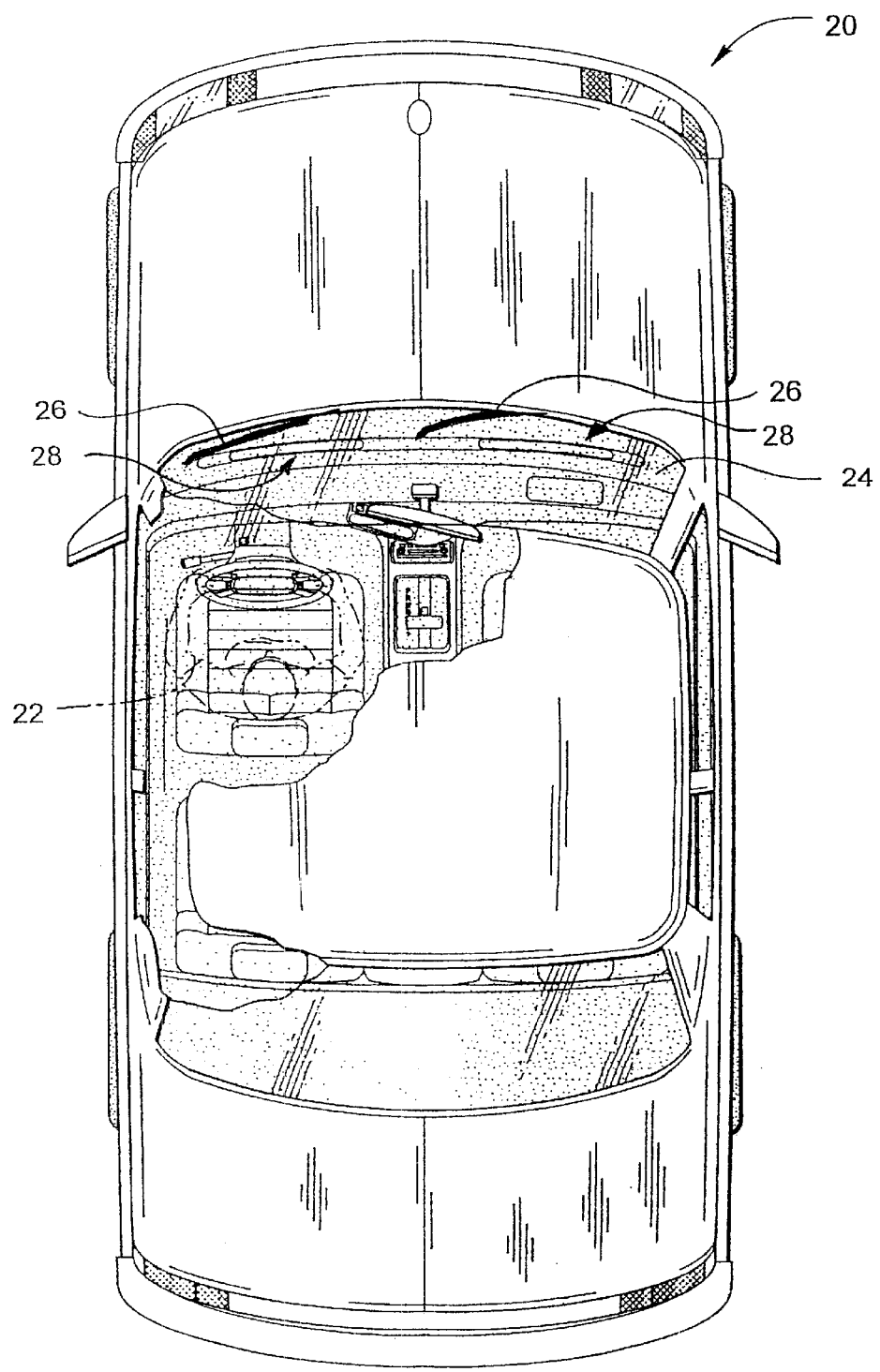
FIG. 1 is a drawing illustrating an automotive vehicle that may incorporate the present invention.

Referring to FIG. 1, a drawing illustrating an automotive vehicle that may incorporate the present invention is shown. Vehicle 20 is driven by operator 22. Operator 22 views a scene in front of vehicle 20 through windshield 24. Moisture, such as rain, snow, ice, frost, fog, and the like, may deposit on windshield 24, degrading the ability of operator 22 to see through windshield 24. Windshield wipers 26 wipe the outside surface of windshield 24 to remove moisture and debris. A defogger system, shown generally by 28, blows hot air onto the inside surface of windshield 24 to remove ice, frost, and fog. The present invention may be used to automatically activate wipers 26 and defogger system 28 by recognizing the presence of moisture on windshield 24.

Figure 2:
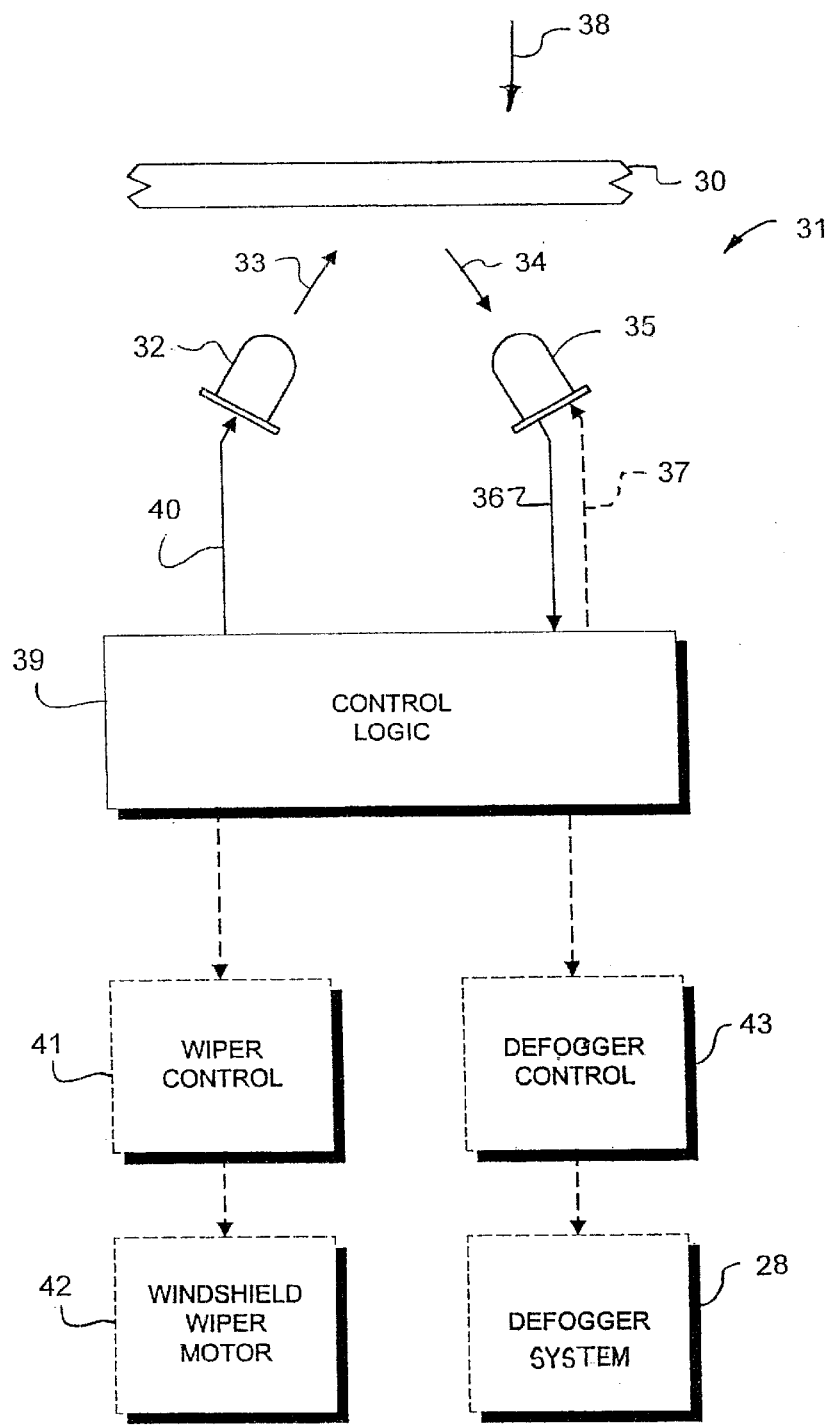
FIG. 2 is a block diagram of an embodiment of the present invention.

Referring now to FIG. 2, a block diagram of an embodiment of the present invention is shown. A system for detecting moisture on window 30, shown generally by 31, includes light emitter 32 directed at window 30. Emitter 32 generates emitted radiation 33 which strikes window 30. A portion of emitted radiation 33 is reflected from window 30 as reflected radiation 34. The intensity of reflected radiation 34 is based on the amount of moisture on window 30.

Light sensor 35 receives reflected radiation 34 and accumulates charge in response to incident light 34 over a variable integration period. Light sensor 35 outputs discrete light signal 36 based on the amount of light 34 incident on light sensor 35 over the light integration period. The light integration period may be generated within light sensor 35 or may be supplied by light integration period signal 37. The construction of light sensor 35 is described with regards to FIGS. 5–25 below.

Ambient light 38 represents a source of noise which may mix with reflected radiation 34, affecting light signal 36. If window 30 is vehicle windshield 24, ambient light 38 may result from solar radiation, reflected sunlight, headlamps from oncoming vehicles, street lights, and the like.

Ambient light 38 may vary over a wide dynamic range. Removing the effects of ambient light 38 improves the ability of moisture detecting system 31 to detect moisture. Various designs may be used to reduce the amount of ambient light 38 striking light sensor 35 including channels and baffles for deflecting light away from light sensor 35 and surfaces to reflect or refract ambient light 38 away from light sensor 35 as is known in the art.

Control logic 39 is connected to light emitter 32 and light sensor 35. Control logic 39 generates emitter signal 40 to turn on and off light emitter 32. In an embodiment of the present invention, control logic 39 receives a first light signal 36 from light sensor 35 with emitter 32 turned off to obtain an indication of the level of ambient light 38. Emitter 32 is then turned on. Control logic 39 receives a second light signal 36 from light sensor 35. The presence of moisture on window 30 is then determined based on the first light signal 36 and the second light signal 37.

If moisture detecting system 31 is used to detect moisture on vehicle windshield 24, control logic 39 may control wiper control 41 for activating windshield wiper motor 42 driving windshield wipers 26 and may also control defogger control 43 for activating defogger system 28.

The complexity and cost of control logic 39 is minimized through the use of light sensor 35 which outputs discrete light signal 36 based on the amount of light 34 incident on light sensor 35 over a light integration period. Embodiments of control logic 39 are described with regards to FIGS. 5–9 below.

In the embodiment shown in FIG. 2, a single light emitter 32 and a single light sensor 35 are shown. However, it is within the spirit and scope of the present invention to include more than one emitter 32, more than one light sensor 35, or a plurality of both emitters 32 and sensors 35. Also, control logic 39 may be adapted to control a wide variety of flinctions including closing windows, cleaning windows, activating lamps, and the like. Further, while detecting moisture on a window is described, the present invention may be readily adapted to detect a wide variety of extraneous matter on differing surfaces.

Figure 3:
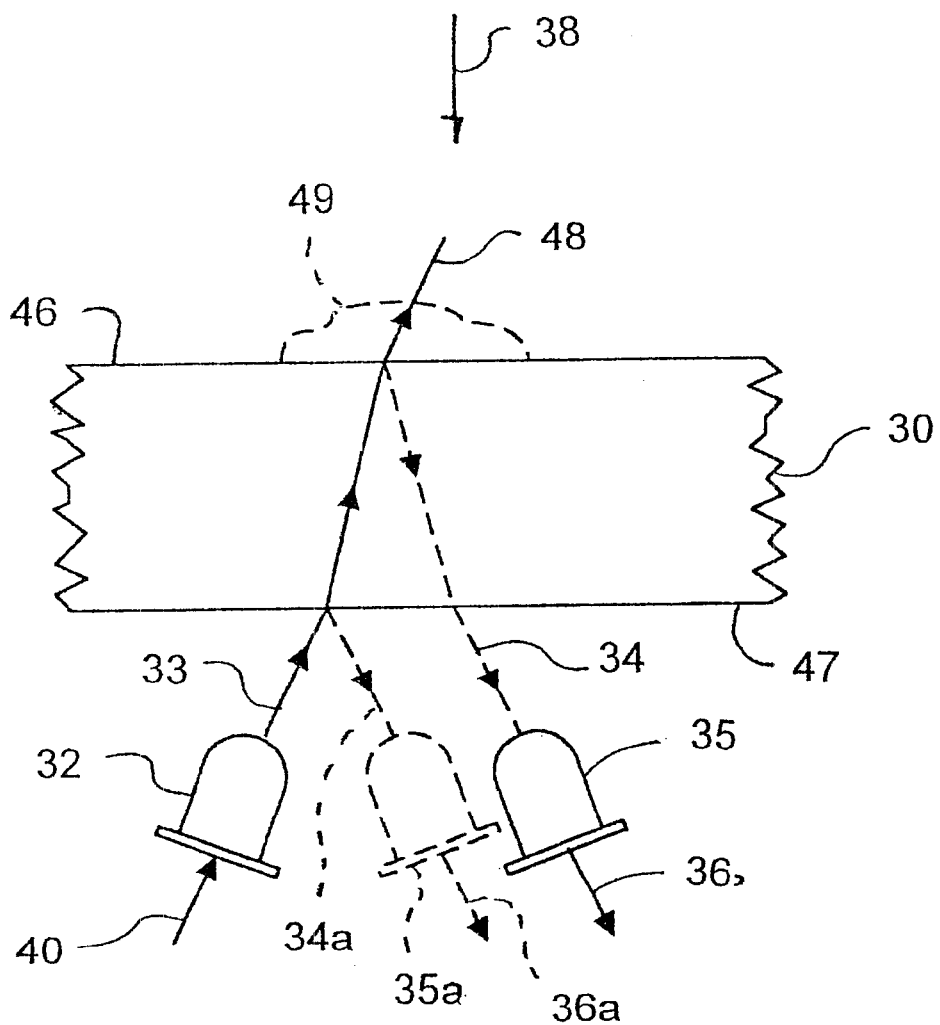
FIG. 3 is a ray diagram illustrating an embodiment of the present invention wherein moisture on an outside surface causes an increase in reflected light.

Referring now to FIG. 3, a ray diagram illustrating an embodiment of the present invention wherein moisture on an outside surface causes an increase in reflected light is shown. Window 30 has outer surface 46 and inner surface 47. In the absence of moisture, emitted radiation 33 passes through inner surface 47 and outer surface 46 to become exiting ray 48. Moisture on outer surface 46, such as droplet 49, causes at least some of emitted radiation 33 to be reflected as reflected radiation 34, which is detected by light sensor 35 and converted to discrete light signal 36. A second light sensor, indicated by 35a, may be positioned to detect moisture on inner surface 47. Emitted radiation 33 may reflect off moisture, such as fog or frost, on inner surface 47 producing reflected radiation 34a. Second light sensor 35a generates discrete light signal 36a indicating the presence of moisture on inner surface 47.

Figure 4:
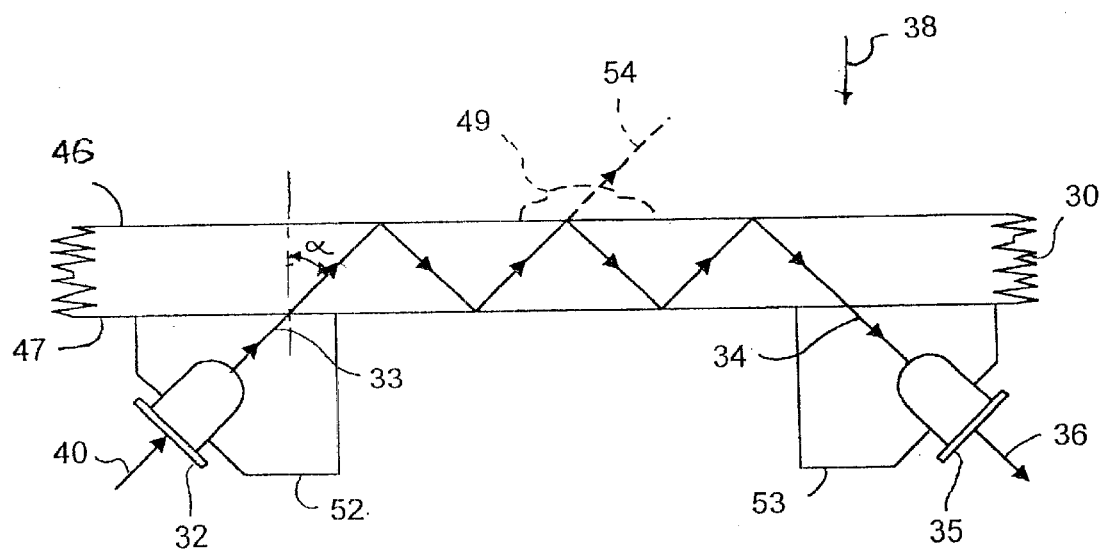
FIG. 4 is a ray diagram illustrating an embodiment of the present invention wherein moisture on an outside surface causes a decrease in reflected light.

Referring now to FIG. 4, a ray diagram illustrating an embodiment of the present invention wherein moisture on an outside surface causes a decrease in reflected light is shown. Light emitter 40 is positioned such that emitted radiation 33 strikes inner surface 47 at an angle of incidence a allowing emitted radiation 33 to pass through inner surface 47 and be totally reflected between outer surface 46 and inner surface 47 at least once before exiting as reflected radiation 34. To facilitate emitted radiation 33 entering inner surface 46, emitter 32 is placed in input coupler 52 which is attached to inner surface 47. To facilitate reflected radiation 34 exiting inner surface 46, light sensor 35 is placed in output coupler 53 which is attached to inner surface 47. Input coupler 52 and output coupler 53 are constructed of a material having an index of refraction similar to the index of refraction of window 30. For window 30 constructed of glass and surrounded by air, the index of refraction is approximately 1.49 and the angle of incidence a must be greater than 42°. If moisture, such as droplet 49, is present on outer surface 46 or inner surface 47, total reflection between outer surface 46 and inner surface 47 is impaired, permitting exiting ray 54. This decreases reflected radiation 34 received by light sensor 35. Light sensor 35 outputs discrete light signal 36 indicating the intensity of reflected radiation 34.

Input coupler 52 and output coupler 53 may be designed to reduce the effect of ambient light 38 reaching light sensor 35. In particular, reflective and refractive surfaces on coupler 52, 53 serve to direct reflected radiation 34 into light sensor 35 and direct ambient light 38 away from light sensor 35. Flanges, baffles, shields, and the like may also block ambient light 38. Couplers may further be designed to prevent spurious reflected radiation from layers within window 30. Various designs for couplers 52,53 include those disclosed in U.S. Pat. No. 5,811,793 to Pientka; U.S. Pat. No. 5,661,303 to Teder; U.S. Pat. No. 5,498,866 to Bendicks et al.; and U.S. Pat. No. 4,652,745 to Zanardelli; each of which is incorporated by reference herein.

The designs represented by FIGS. 3 and 4 may be combined into a single device to provide greater sensitivity to moisture and to permit detecting moisture on both outer surface 46 and inner surface 47.

For use in detecting moisture on windshield 24, light emitter 32 and light sensor 35 are preferably mounted to monitor moisture in a region of windshield 24 wiped by windshield wipers 26. Mounting locations include within or beside the interior rearview mirror mounting foot or just above the dashboard. Various designs are known in the art and include those described in U.S. Pat. No. 5,821,863 to Schroder et al.; U.S. Pat. No. 5,796,106 to Noack; U.S. Pat. No. 5,661,303 to Teder; U.S. Pat. No. 5,386,111 to Zimmerman; U.S. Pat. No. 4,973,844 to O° Farrell et al.; U.S. Pat. No. 4,960,996 to Hochstein; U.S. Pat. No. 4,930,742 to Schofield et al.; U.S. Pat. No. 4,871,917 to O'Farrell et al.; U.S. Pat. No. 4,867,561 to Fujii et al.; U.S. Pat. No. 4,798,956 to Hochstein; U.S. Pat. No. 4,652,745 to Zanardelli; and RE 35,762 to Zimmerman; each of which is incorporated by reference herein.

Figure 5:
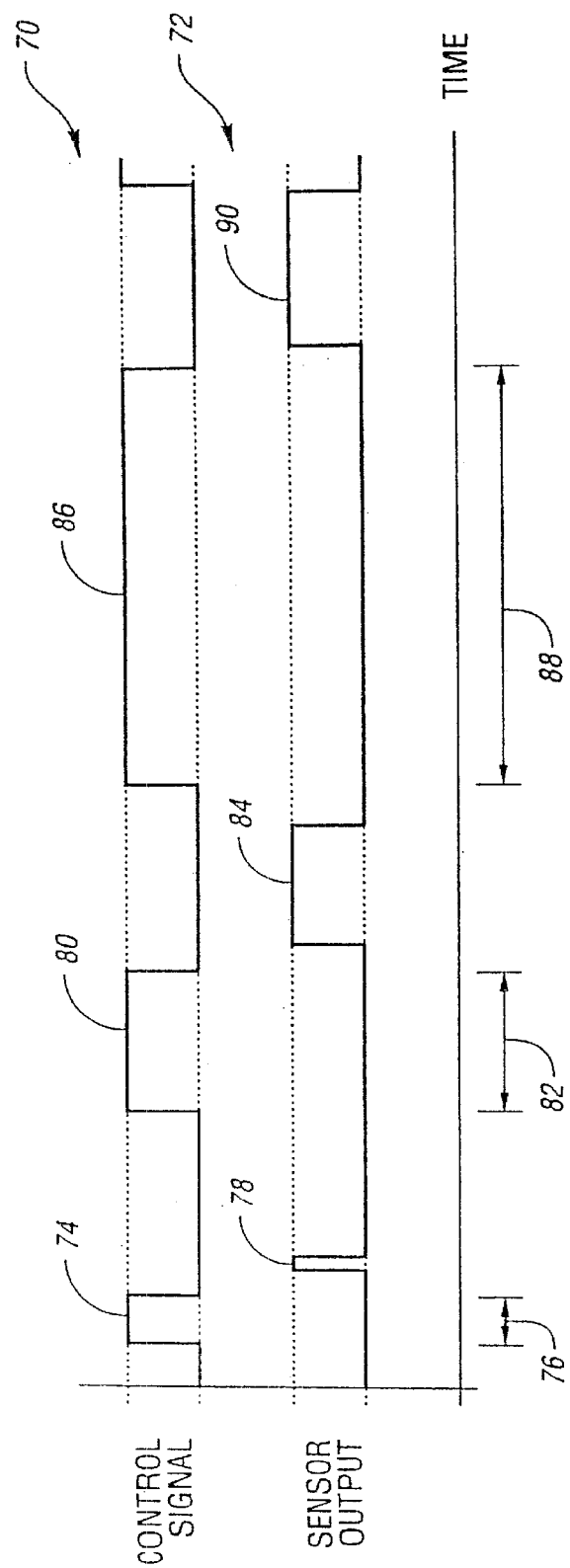
FIG. 5 is a timing diagram illustrating integration control and sensor output for a light sensor that may be used to implement the present invention.

Referring now to FIG. 5, a timing diagram illustrating integration control and sensor output for a light sensor that may be used to implement the present invention is shown. Charge accumulating light sensor 35 exhibits good sensitivity throughout a dynamic range by using a variable integration period. A control signal, shown generally by 70, is used to specify the integration period. The resulting sensor output, shown generally by 72, includes an output pulse for each integration period. The total amount of light-induced charge which can be effectively measured is limited. Therefore, in the presence of bright light, a short integration time is desirable to prevent saturation. However, if a short integration time is used in low light conditions, the charge signal may be lost in noise inherent in sensor 35.

Control signal 70 includes a sequence of integration periods having varying lengths. In the example shown in FIG. 5, short integration pulse 74 having short integration period 76 is generated. A semiconductor light sensor may output a short pulse in a completely dark environment due to noise. Therefore, any pulse in sensor output 72, such as short signal pulse 78, having a duration less than a threshold is ignored. Next, medium integration pulse 80 having medium integration period 82 is generated. Resulting medium signal pulse 84 has a duration indicative of the amount of light incident on sensor 35 during medium integration period 82. Long integration pulse 86 having long integration period 88 is generated. If light sensor 35 is sufficiently bright, saturation will result. Therefore, long signal pulse 90 having a duration greater than a threshold is also ignored.

Control signal 70 may be generated outside of light sensor 35 or may be generated by control logic within light sensor 35. If generated externally, control signal 70 and sensor output 72 may share a common signal line or may use separate signal lines. Various options and embodiments are described with regard to FIGS. 6–25 below.

Figure 6:
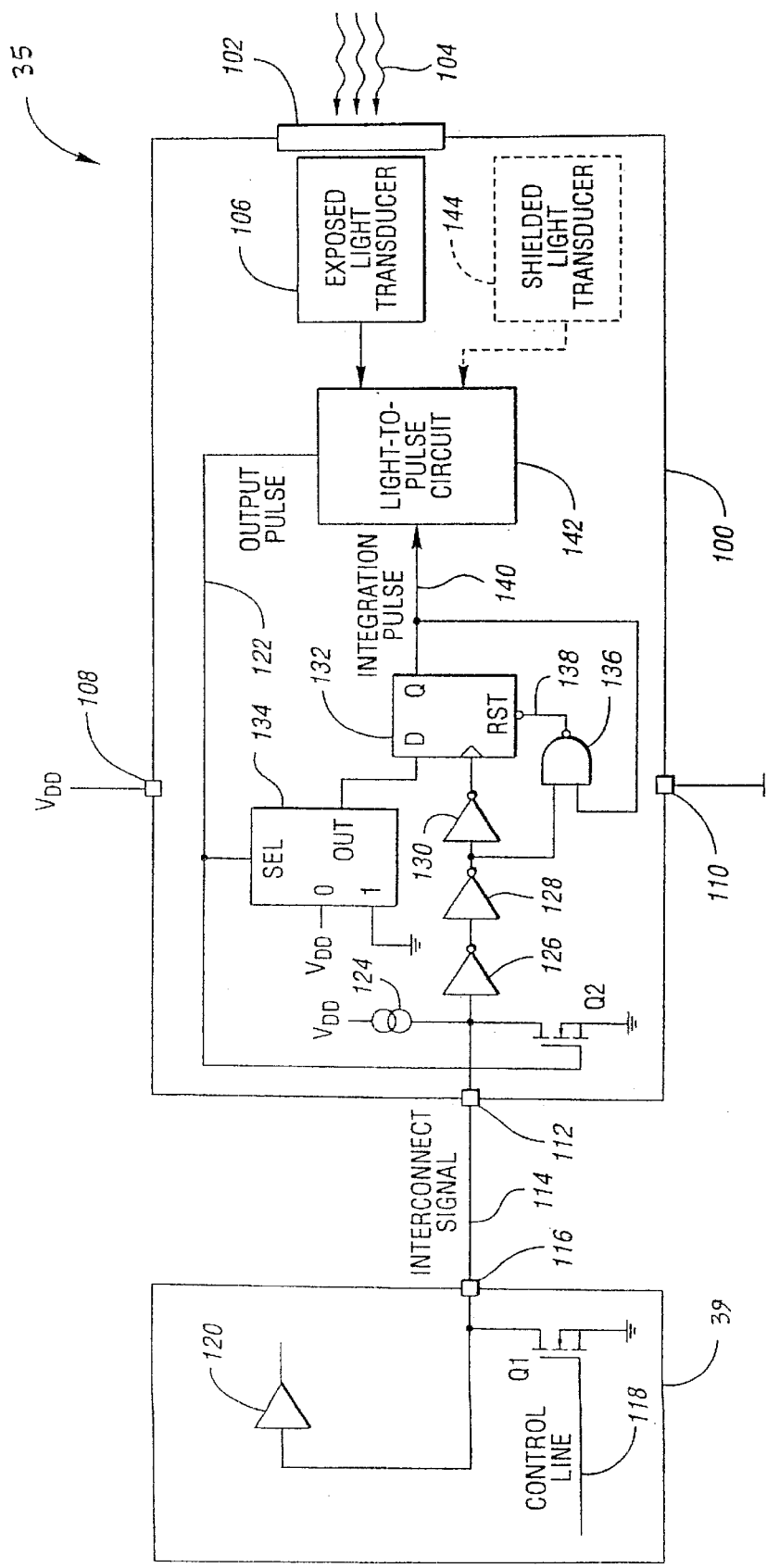
FIG. 6 is a schematic diagram of circuitry permitting control logic and a light sensor to be interconnected by a single line carrying both integration control and sensor output.

Referring now to FIG. 6, a schematic diagram of circuitry permitting control logic and a light sensor to be interconnected by a single line carrying both integration control and sensor output is shown. Light sensor 35 includes enclosure 100 with window 102 admitting light 104 incident on exposed light transducer 106. Light 104 may be reflected radiation 34, ambient light 38, or a combination of both. Enclosure 100 admits power pin 108, ground pin 110, and signal pin 112. The use of only three pins 108, 110, 112 greatly reduces the cost of light sensor 35. A three-pin package that may be used to implement light sensor 35 is described with regards to FIG. 25 below.

Light sensor 35 is connected to control logic 39 through interconnection signal 114 between signal pin 112 in light sensor 35 and signal pin 116 in control logic 39. As will be described below, signal pins 112, 116 are tri-state ports permitting interconnect signal 114 to provide both an input to light sensor 35 and an output from light sensor 35, thereby providing a path for both discrete light signal 36 and light integration period signal 37. Control logic 39 may include FET Q1 connected between signal pin 116 and ground. FET Q1 is controlled by control line 118 connected to the base of Q1. Buffer 120 is also connected to signal pin 116.

Within light sensor 35, FET Q2 is connected between signal pin 112 and ground. FET Q2 is controlled by output pulse 122 connected to the gate of Q2. Constant current source 124 is connected to signal pin 112 so that if neither Q1 or Q2 are on, interconnect signal 114 is pulled high. Constant current source 124 nominally sources about 0.5 mA to pull up interconnect signal 114. The input of Schmidt trigger inverter 126 is connected to signal pin 112. Schmidt trigger inverter 126 is followed by inverters 128 and 130 in series. The output of inverter 130 clocks D flip-flop 132. The output of multiplexer 134 is connected to the D input of flip-flop 132. The select input of multiplexer 134 is driven by output pulse 122 such that when output pulse 122 is asserted, the D input of flip-flop 134 is unasserted and when output pulse 122 is not asserted, the D input of flip-flop 134 is asserted. The output of NAND gate 136 is connected to low asserting reset 138 of flip-flop 132. The output of flip-flop 132 is integration pulse 140. Integration pulse 140 and the output of inverter 128 are inputs to NAND gate 136. Light-to-pulse circuit 142 accepts integration pulse 140 and the output of exposed light transducer 106 and produces output pulse 122. Embodiments for light-to-pulse circuit 142 are described with regard to FIGS. 10–14 and 20–24 below.

In a preferred embodiment, light sensor 35 includes shielded light transducer 144 which does not receive light 104. Light-to-pulse circuit 142 uses the output of shielded light transducer 144 to reduce the effects of noise in exposed light transducer 106.

Figure 7:
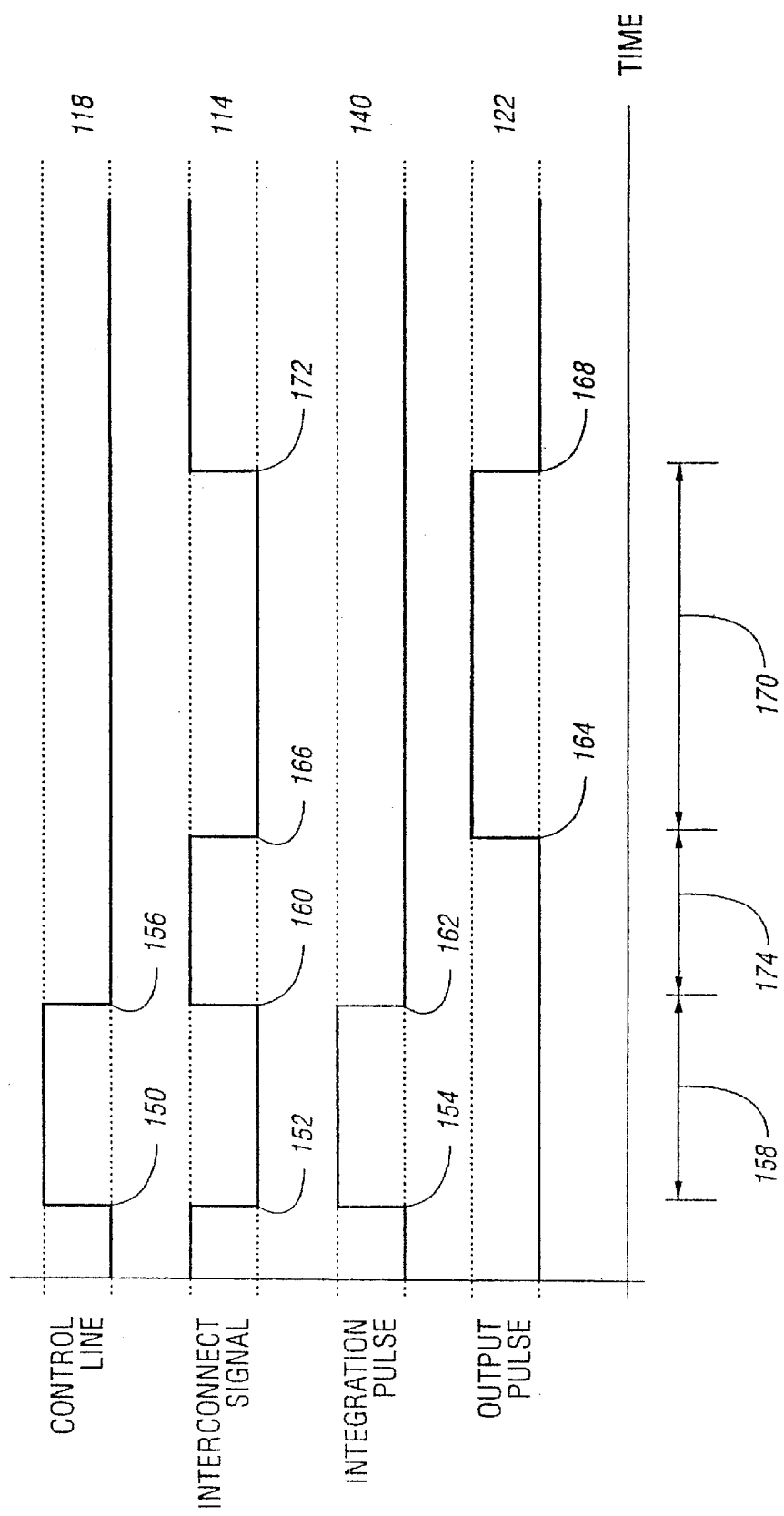
FIG. 7 is a timing diagram illustrating operation of the circuitry of FIG. 6.

Referring now to FIG. 7, a timing diagram illustrating operation of the circuitry of FIG. 6 is shown. Initially, low asserting interconnect signal 114 is high. The state of flip-flop 132 must be zero for, if the state is one, both inputs to NAND gate 136 would be high, asserting reset 138 and forcing the state of flip-flop 132 to zero.

At time 150, control logic 39 asserts control line 118 turning transistor Q1 on. Interconnect signal 114 is then pulled low at time 152. The output of inverter 130 transitions from low to high setting the state of flip-flop 132 to one which causes integration pulse 140 to become asserted at time 154. Light-to-pulse circuit 142 begins integrating light 104 incident on exposed light transducer 106. At time 156, control line 118 is brought low turning transistor Q1 off. The difference between time 156 and time 150 is integration period 158 requested by control logic 39. Since both Q1 and Q2 are off, interconnect signal 114 is pulled high by current source 124 at time 160. Since the output of inverter 128 and integration pulse 140 are both high, reset 138 is asserted causing the state of flip-flop 132 to change to zero and integration pulse 140 to become unasserted at time 162. This signals light-to-pulse circuit 142 to stop integrating light 104 incident on exposed light transducer 106.

At time 164, light-to-pulse circuit 142 asserts output pulse 122 to begin outputting light intensity information. Asserting output pulse 122 turns transistor Q2 on, pulling interconnect signal 144 low at time 166. This causes inverter 130 to output a low-to-high transition clocking a zero as the state of flip-flop 132. Light-to-pulse circuit 142 deasserts output pulse 122 at time 168. The difference between time 168 and time 164 is light intensity period 170 indicating the amount of light 104 incident on exposed light transducer 106 over integration period 158. Transistor Q2 is turned off when output pulse 122 goes low at time 168. Since both transistors Q1 and Q2 are off, interconnect signal 114 is pulled high at time 172. Buffer 120 in control logic 39 detects the transitions in interconnect signal 114 at times 166 and 172. The difference in time between times 172 and 166 is used by control logic 39 to determine the intensity of light 104 received by light sensor 35.

If shielded light transducer 144 is included in light sensor 35, the difference in time between the deassertion of integration pulse 140 at time 162 and the assertion of output pulse 122 at time 164 is due, in part, to the thermal noise in light sensor 35. This difference is expressed as thermal noise period 174. Thermal noise period 174 may be used by control logic 39 to determine the temperature of light sensor 35 or may be more simply used to determine if the noise level in sensor 35 is too high for a reliable reading. Control logic 39 may disable automatic dimming of dimming element 40 if the temperature of light sensor 35 exceeds a preset limit. The ability of light sensor 35 to use the output from shielded light transducer 144 to generate output pulse 122 indicative of the amount of thermal noise in light sensor 35 is described with regard to FIGS. 12–14 below.

Figure 8:
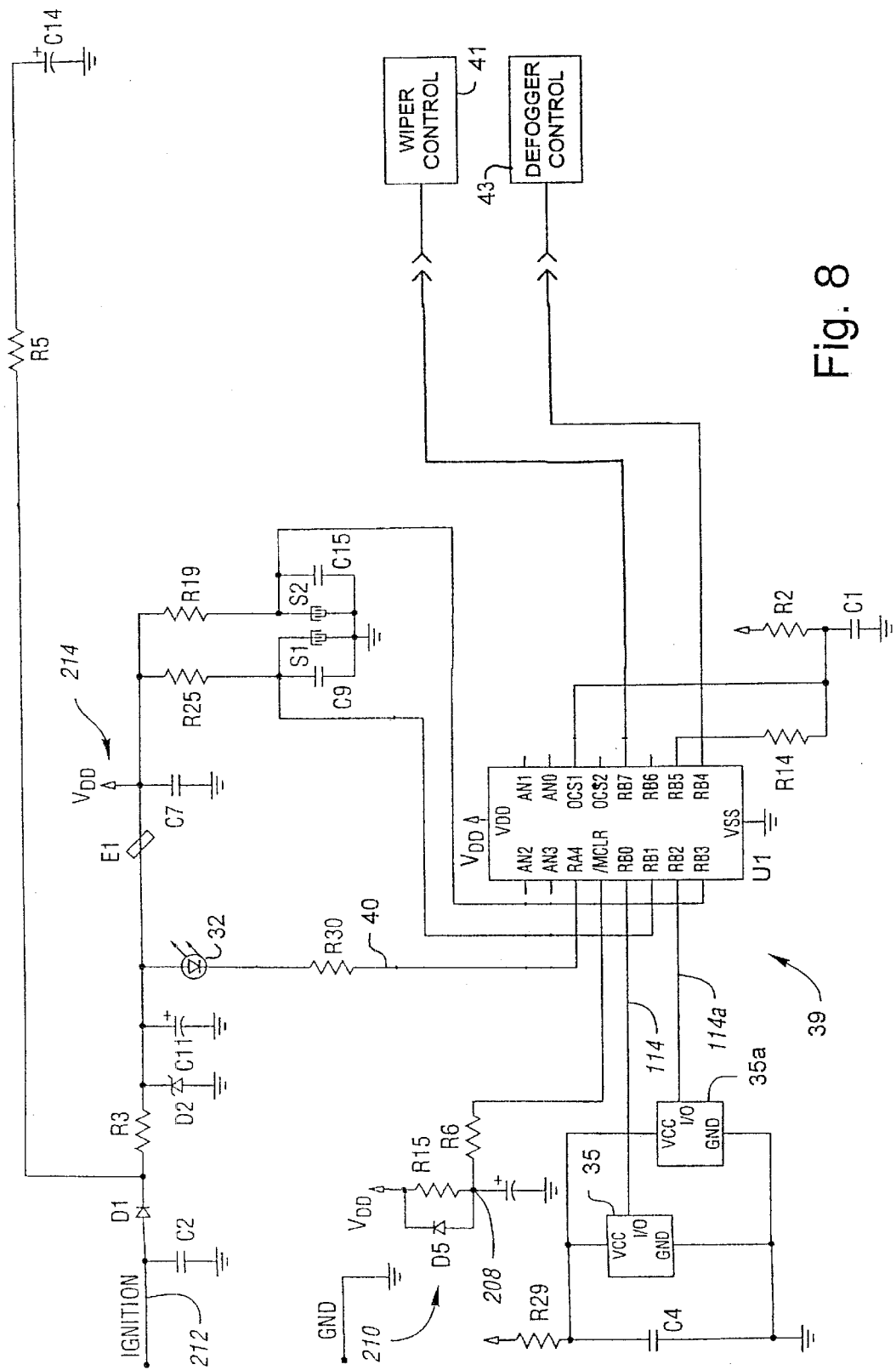
FIG. 8 is a schematic diagram illustrating an embodiment of the control logic.

Referring now to FIG. 8, a schematic diagram illustrating an embodiment of the control logic is shown. The circuit represents an effective yet inexpensive implementation for moisture detecting system 31 used to detect moisture on windshield 24. Control logic 39 utilizes a small, low cost microcontroller, indicated by U1, such as the PIC16C620 from Microchip Technology, Inc. of Chandler, Ariz. Light sensor 35 communicates with microcontroller U1 through interconnection signal 114 connected to microcontroller input RB0. Light sensor 35 is used to detect moisture on windshield outer surface 46 in a manner described with regards to FIGS. 3 and 4 above. Similarly, light sensor 35a communicates with microcontroller U1 through interconnection signal 114a connected to microcontroller input RB2. Light sensor 35a is used to detect moisture on windshield inner surface 47 as described with regards to FIG. 3 above. As described with regard to FIGS. 6 and 7 above, each interconnection signal 114, 114a carries integration period 158 from microcontroller U1 to light sensor 35, 35a as well as light intensity period 170 from light sensor 35,35a to microcontroller U1. Resistor R29 and capacitor C4 connected between $V_{DD}$ and ground provide filtered power for light sensors 35, 35a.

Parallel resistor R15 and diode D5 are connected between $V_{DD}$ and node 208. Capacitor C12 is connected between node 208 and ground. Resistor R6 connects common node 208 to input /MCLR of microcontroller U1. Components D5, R15, R6, and C12 form a power-on reset circuit shown generally by 210. Power is supplied to control logic 39 through ignition line 212. Diode D1 protects from reversed polarity on ignition line 212 and diode D2 clamps the voltage derived from ignition line 212 to approximately five volts. Capacitors C2, C7, and C11; resistor R3; and ferrite element E1 form a power conditioning circuit shown generally by 214. Microcontroller U1 is clocked by an RC oscillator formed by resistor R2 connected between the OSCL pin and $V_{DD}$ and capacitor C1 connected between the OSC1 pin and ground. Current limiting resistor R30 is connected in series with LED light emitter 32 between $V_{DD}$ and open drain output RA4 of microcontroller U1. Output RA4, therefore, provides emitter signal 40. Switches S1 and S2 are connected to digital inputs RB1 and RB3, respectively, of microcontroller U1 to permit selecting control options.

Wiper control 41 is connected to microcontroller U1 through digital output RB7. Defogger control 43 is connected to microcontroller U1 through digital output RB4. Analog and digital outputs on microcontroller U1 not dedicated to other purposes may be used to provide additional control signals to wiper control 41 or defogger control 43. Also, either or both of wiper control 41 and defogger control 43 may be connected to microcontroller U1 through pulse width modulated signals, pulse density signals, serial data streams, an automotive bus such as the CAN bus, or the like.

Figure 9:
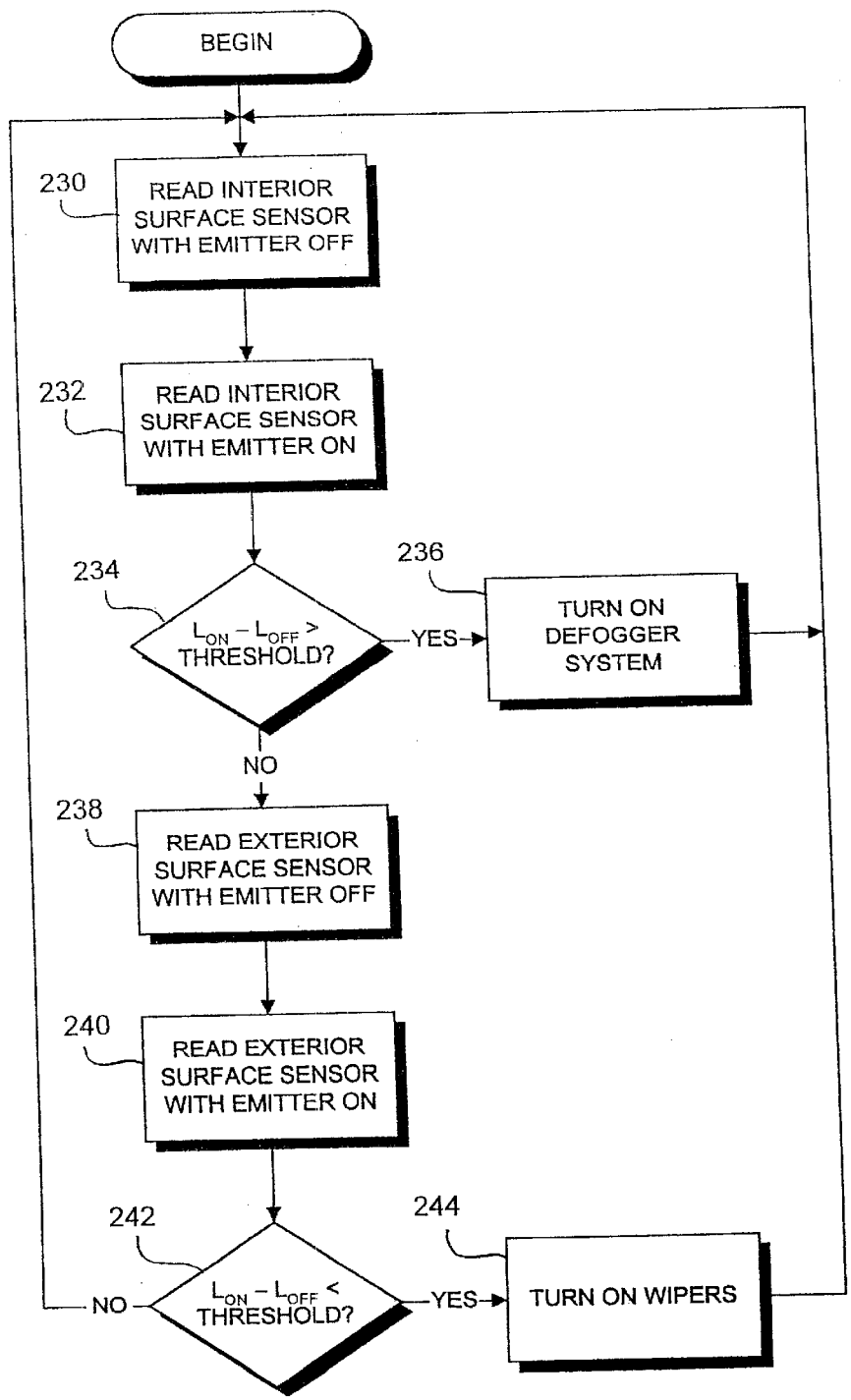
FIG. 9 is a flow diagram illustrating operation of an embodiment of the present invention.

Referring now to FIG. 9, a flow diagram illustrating operation of an embodiment of the present invention is shown. As will be appreciated by one of ordinary skill in the art, the operations illustrated are not necessarily sequential operations. Also, though the operations are preferably implemented by software executing in microcontroller U1, operations may be performed by software, hardware, or a combination of both. The present invention transcends any particular implementation and aspects are shown in sequential flow chart form for ease of illustration.

Light sensor 35a is read with light emitter 32 switched off to obtain a level of ambient light 38 in block 230. Emitter 32 is activated and light sensor 35a is read a second time to determine the amount of reflected radiation 34a from interior surface 47 in block 232. In an embodiment of the present invention, the integration period for the second reading is based on the level of ambient light obtained in block 230. In another embodiment of the present invention, the intensity of emitted radiation 33 from emitter 32 is modified based on the level of light determined in block 230. The level of intensity of emitted radiation 33 may be controlled by using a pulse width modulated voltage for emitter signal 40.

Light signal 36a produced with emitter 32 turned on is compared to light signal 36a produced with emitter 32 turned off in block 234. If the difference between light signal 36a produced with emitter 32 on and light signal 36a produced with emitter 32 off exceeds an interior surface threshold, defogger system 28 is turned on in block 236. If the difference is not greater than the interior surface threshold, a check is made to determine if wipers 26 should be activated beginning with block 238.

In an embodiment of the present invention, the interior surface threshold is based on the level of ambient light 38 obtained in block 230. In another embodiment of the present invention, a greater threshold is used to determine if a check to activate wipers 26 should be made. If reflected radiation 34a is too great, excessive moisture is present on the inside of windshield 24, and an accurate reading of the moisture on outer surface 46 cannot be obtained. If the level of reflected radiation 34a is between the two thresholds, defogger system 28 is activated and a check to activate wipers 26 is made.

Light sensor 35 is read with light emitter 32 switched off to obtain a level of ambient light 38 in block 238. Emitter 32 is activated and light sensor 35 is read a second time to determine the amount of reflected radiation 34 from exterior surface 46 in block 240. In an embodiment of the present invention, the integration period for the second reading is based on the level of ambient light obtained in block 238. In another embodiment of the present invention, the intensity of emitted radiation 33 from emitter 32 is modified based on the level of ambient light 38 obtained in block 238 and on the level of reflected light 34a detected by light sensor 35a.

Light signal 36 produced with emitter 32 on is compared to light signal 36 produced with emitter 32 off in block 242. In a preferred embodiment, the configuration of emitter 32 and light sensor 35 described with regards to FIG. 4 above is used. Hence, if the difference between light signal 36 produced with emitter 32 on and light signal 36 produced with emitter 32 off is less than an exterior surface threshold, wipers 26 are turned on in block 244. The check for activating defogger system 28 beginning with block 230 is then repeated.

In an embodiment of the present invention, the comparison of block 242 includes the level of reflected radiation 34a off inner surface 47. This is because reflected radiation 34 can be no greater than emitted radiation 33 less reflected radiation 34a. In another embodiment of the present invention, the exterior threshold is based on the level of ambient light 38 obtained in block 238.

Many other algorithms for determining the presence of moisture on window 30 may be used within the spirit and scope of the present invention. Some of these algorithms are described in U.S. Pat. No. 5,796,106 to Noack; U.S. Pat. No. 5,386,111 to Zimmerman; U.S. Pat. No. 5,276,389 to Levers; U.S. Pat. No. 4,956,591 to Schierbeek et al.; U.S. Pat. No. 4,916,374 to Schierbeek et al.; U.S. Pat. No. 4,867,561 to Fujii et al.; U.S. Pat. No. 4,859,867 to Larson et al.; U.S. Pat. No. 4,798,956 to Hochstein; 4,355,271 to Noack; and RE 35,762 to Zimmerman; each of which is incorporated by reference herein.

Figure 10:
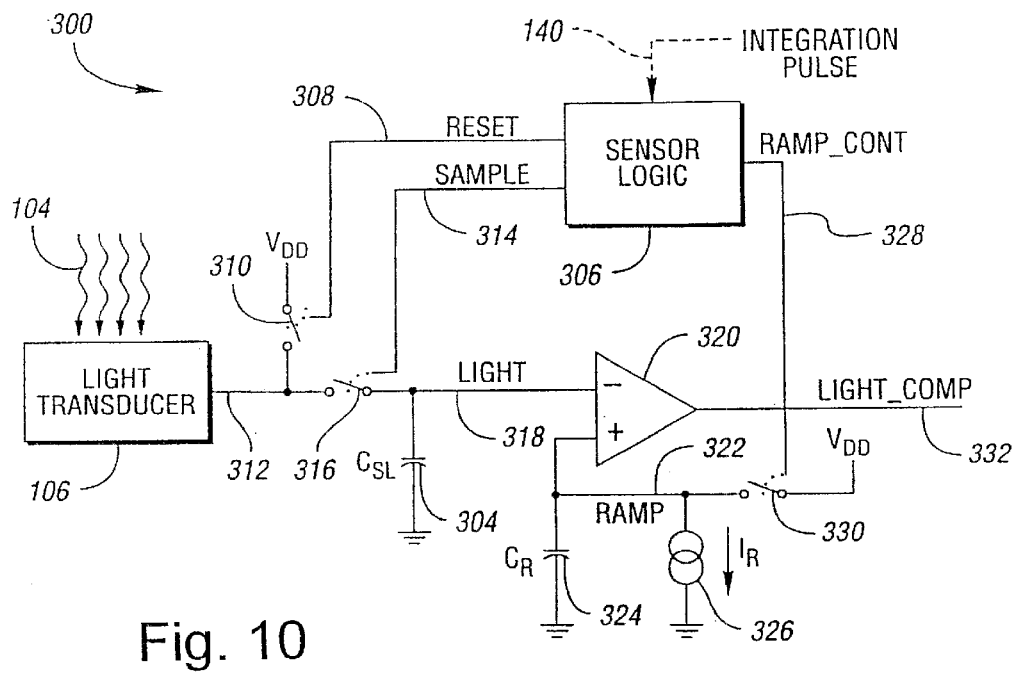
FIG. 10 is a schematic diagram illustrating operation of a light sensor having a pulse output according to an embodiment of the present invention.

Referring now to FIG. 10, a schematic diagram illustrating operation of a light sensor having a pulse output according to an embodiment of the present invention is shown. Light-to-pulse circuit 300 includes exposed light transducer 106 for converting light 104 incident on exposed light transducer 106 into charge accumulated in light storage capacitor 304, indicated by $C_{SL}$. Exposed light transducer 106 may be any device capable of converting light 104 into charge, such as the photogate sensor described in U.S. Pat. No. 5,471,515 titled "ACTIVE PIXEL SENSOR WITH INTRA-PIXEL CHARGE TRANSFER" to E. Fossum et al., which is incorporated herein by reference. Preferably, light transducer 106 is a photodiode such as is described with regards to FIGS. 22–24 below. Except as noted, the following discussion does not depend on a particular type of construction for exposed light transducer 106.

Light-to-pulse circuit 300 operates under the control of sensor logic 306. Sensor logic 306 generates reset signal 308 controlling switch 310 connected between exposed light transducer output 312 and $V_{DD}$. Sensor logic 306 also produces sample signal 314 controlling switch 316 between exposed light transducer output 312 and light storage capacitor 304. The voltage across light storage capacitor 304, light storage capacitor voltage 318, is fed into one input of comparator 320. The other input of comparator 320 is ramp voltage 322 across ramp capacitor 324. Ramp capacitor 324 is in parallel with current source 326 generating current $I_R$. Sensor logic 306 further produces ramp control signal 328 controlling switch 330 connected between ramp voltage 322 and $V_{DD}$. Comparator 320 produces comparator output 332 based on the relative levels of light storage capacitor voltage 318 and ramp voltage 322. Sensor logic 306 may generate reset signal 308, sample signal 314, and ramp control signal 330 based on internally generated timing or on externally generated integration pulse 140 as described with regard to FIGS. 15–18 below.

Figure 11:
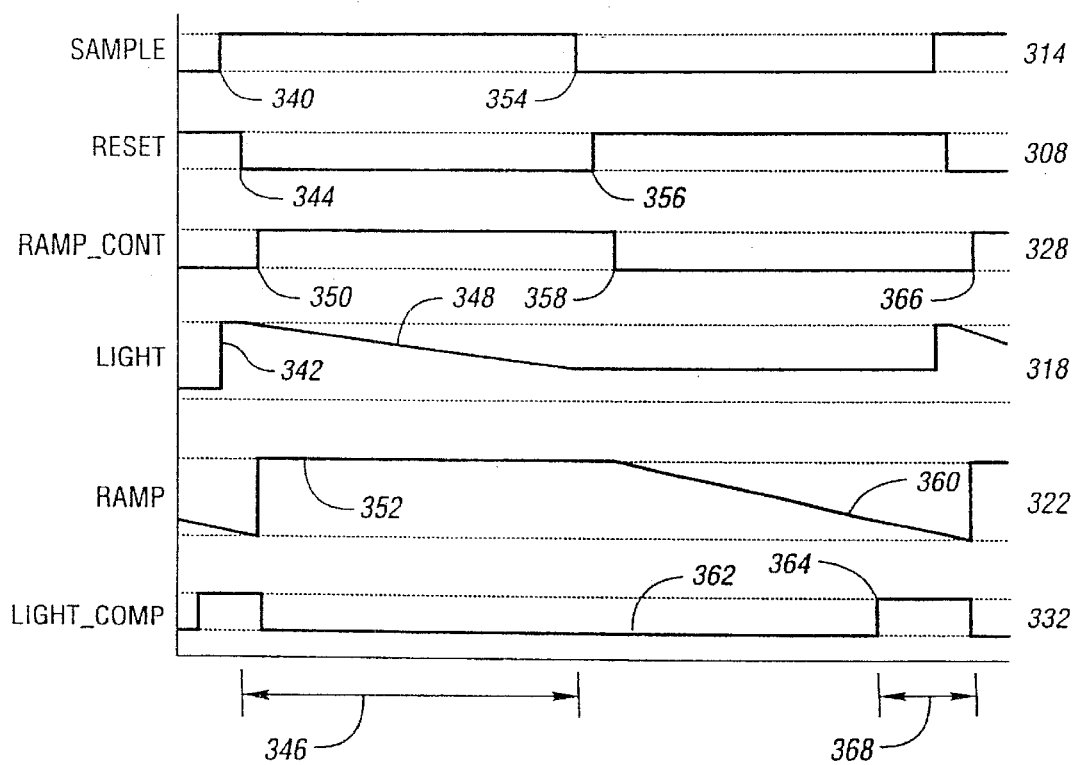
FIG. 11 is a timing diagram illustrating operation of the light sensor of FIG. 10.

Referring now to FIG. 11, a timing diagram illustrating operation of the light sensor of FIG. 10 is shown. A measurement cycle is started at time 340 when sample signal 314 is asserted while reset signal 308 is asserted. This closes switch 316 to charge light storage capacitor 304 to $V_{DD}$ as indicated by voltage level 342 in light storage capacitor voltage 318. Reset signal 308 is then deasserted at time 344, opening switch 310 and beginning integration period 346. During integration period 346, light 104 incident on exposed light transducer 106 generates negative charge causing declining voltage 348 in light storage capacitor voltage 318. At time 350, ramp control signal 328 is asserted closing switch 330 and charging ramp capacitor 324 so that ramp voltage 322 is $V_{DD}$ as indicated by voltage level 352.

Sample signal 314 is deasserted at time 354, causing switch 316 to open, thereby ending integration period 346. At some time 356 following time 354 and prior to the next measurement cycle, reset signal 308 must be asserted closing switch 310. At time 358, ramp control signal 328 is deasserted opening switch 330. This causes ramp capacitor 324 to discharge at a constant rate through current source 326 as indicated by declining voltage 360 in ramp voltage 322. Initially, as indicated by voltage level 362, comparator output 332 is unasserted because ramp voltage 322 is greater than light storage capacitor voltage 318. At time 364, declining voltage 360 in ramp voltage 322 drops below light storage capacitor voltage 318 causing comparator output 332 to become asserted. Comparator output 322 remains asserted until time 366 when ramp control signal 328 is asserted closing switch 330 and pulling ramp voltage 322 to $V_{DD}$. The difference between time 366 and time 364, indicated by pulse duration 368, is inversely related to the amount of light 104 received by exposed light transducer 106 during integration period 346.

Figure 12:
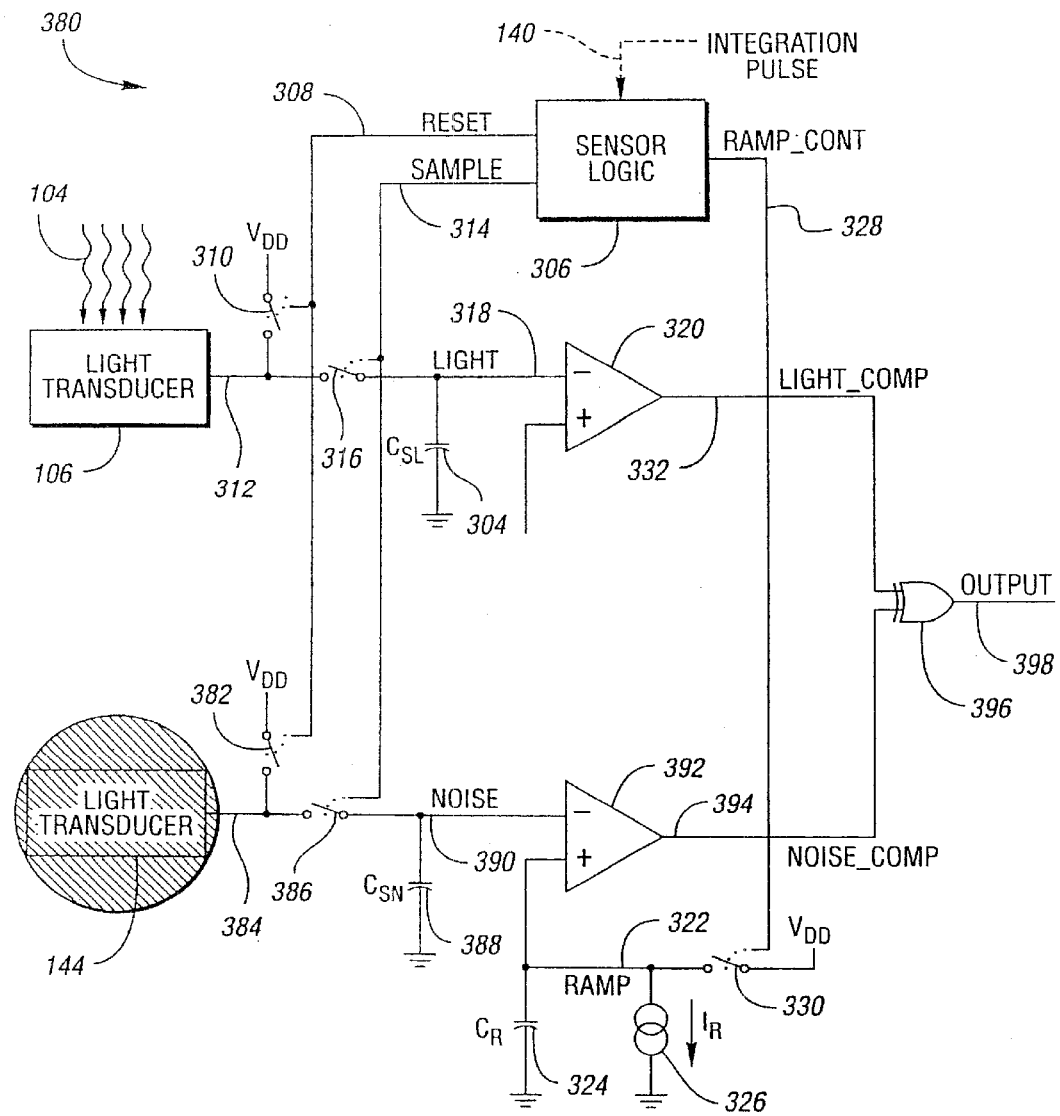
FIG. 12 is a schematic diagram illustrating operation of a light sensor with noise compensation according to an embodiment of the present invention.

Referring now to FIG. 12, a schematic diagram illustrating operation of a light sensor with noise compensation according to an embodiment of the present invention is shown. A light-to-pulse circuit, shown generally by 380, improves upon light-to-pulse circuit 300 by incorporating shielded light transducer 144 and associated electronics. Shielded light transducer 144 preferably has the same construction as exposed light transducer 106. However, shielded light transducer 144 does not receive light 104. Charge generated by shielded light transducer 144, therefore, is only a function of noise. This noise is predominately thermal in nature. If shielded light transducer 144 has the same construction as exposed light transducer 106, the noise signal produced by shielded light transducer 144 will closely approximate the same noise within the signal produced by exposed light transducer 106. By subtracting the signal produced by shielded light transducer 144 from the signal produced by exposed light transducer 106, the effect of noise in light transducer 106 can be greatly reduced.

Reset signal 308 controls switch 382 connected between shielded transducer output 384 and $V_{DD}$. Sample signal 314 controls switch 386 connected between shielded transducer output 384 and noise storage capacitor 388, indicated by $C_{SN}$. The voltage across noise storage capacitor 388, noise storage capacitor voltage 390, is one input to comparator 392. The second input to comparator 392 is ramp voltage 322. The output of comparator 392, noise comparator output 394, and comparator output 332 serve as inputs to exclusive-OR gate 396. Exclusive-OR gate 396 generates exclusive-OR output 398 indicating the intensity of light 104.

Figure 13:
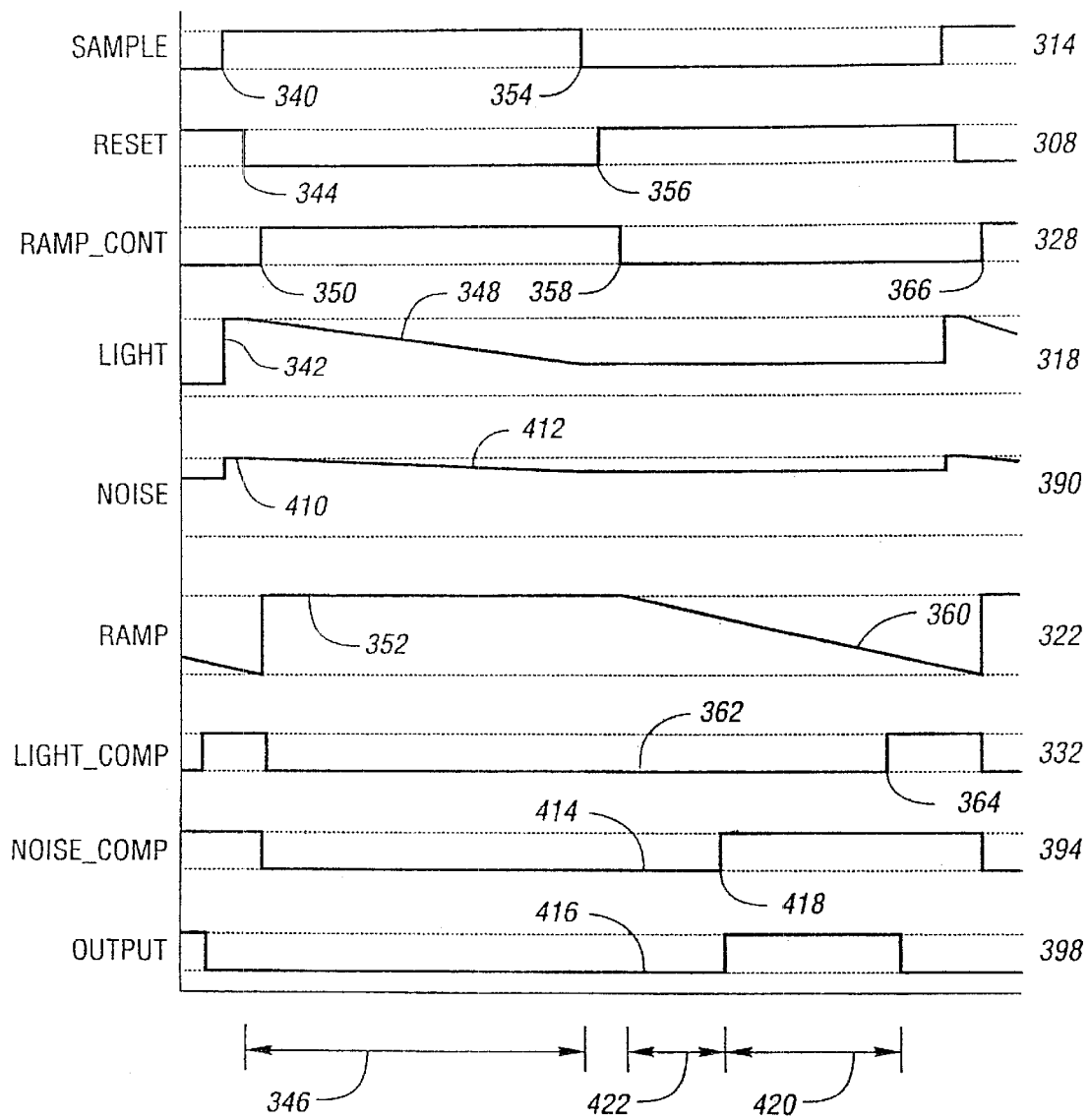
FIG. 13 is a timing diagram illustrating operation of the light sensor of FIG. 12.

Referring now to FIG. 13, a timing diagram illustrating operation of the light sensor of FIG. 12 is shown. Light-to-pulse circuit 380 functions in the same manner as light-to-pulse in circuit 300 with regard to reset signal 308, sample signal 314, light storage capacitor voltage 318, ramp voltage 322, ramp control signal 328, and comparator output 332. At time 340, sample signal 314 is asserted while reset signal 308 is asserted. Switches 382 and 386 are both closed charging noise storage capacitor 388 to $V_{DD}$ as indicated by voltage level 410 in noise storage capacitor voltage 390. At time 344, reset signal 308 is deasserted opening switch 382 and causing declining voltage 412 in noise storage capacitor voltage 390 from charge produced by shielded light transducer 144 due to noise. At time 354, sample signal 314 is deasserted ending integration period 346 for noise collection. At time 358, ramp control signal 328 is deasserted causing declining voltage 360 in ramp voltage 322. Initially, as indicated by voltage level 414, noise comparator output 394 is unasserted because ramp voltage 322 is greater than noise storage capacitor voltage 390. Since comparator output 332 is also unasserted, output 398 from comparator 396 is unasserted as indicated by voltage level 416. At time 418, ramp voltage 322 drops below the level of noise storage capacitor voltage 390, causing noise comparator output 394 to become asserted. Since noise comparator output 394 and comparator output 332 are different, output 398 from comparator 396 is asserted. At time 364, ramp voltage 322 drops beneath the level of light storage capacitor voltage 318, causing comparator output 332 to become asserted. Since both noise comparator output 394 and comparator output 332 are now asserted, output 398 from exclusive-OR gate 396 now becomes unasserted. The difference between time 364 and time 418, output pulse duration 420, has a time period proportional to the intensity of light 104 incident on exposed light transducer 106 less noise produced by shielded light transducer 144 over integration period 346. The duration between time 418 and time 358, noise duration 422, is directly proportional to the amount of noise developed by shielded light transducer 144 over integration period 346. Since the majority of this noise is thermal noise, noise duration 422 is indicative of shielded light transducer 144 temperature. At time 366, ramp control signal 328 is asserted, deasserting both noise comparator output 394 and comparator output 332.

Figure 14:
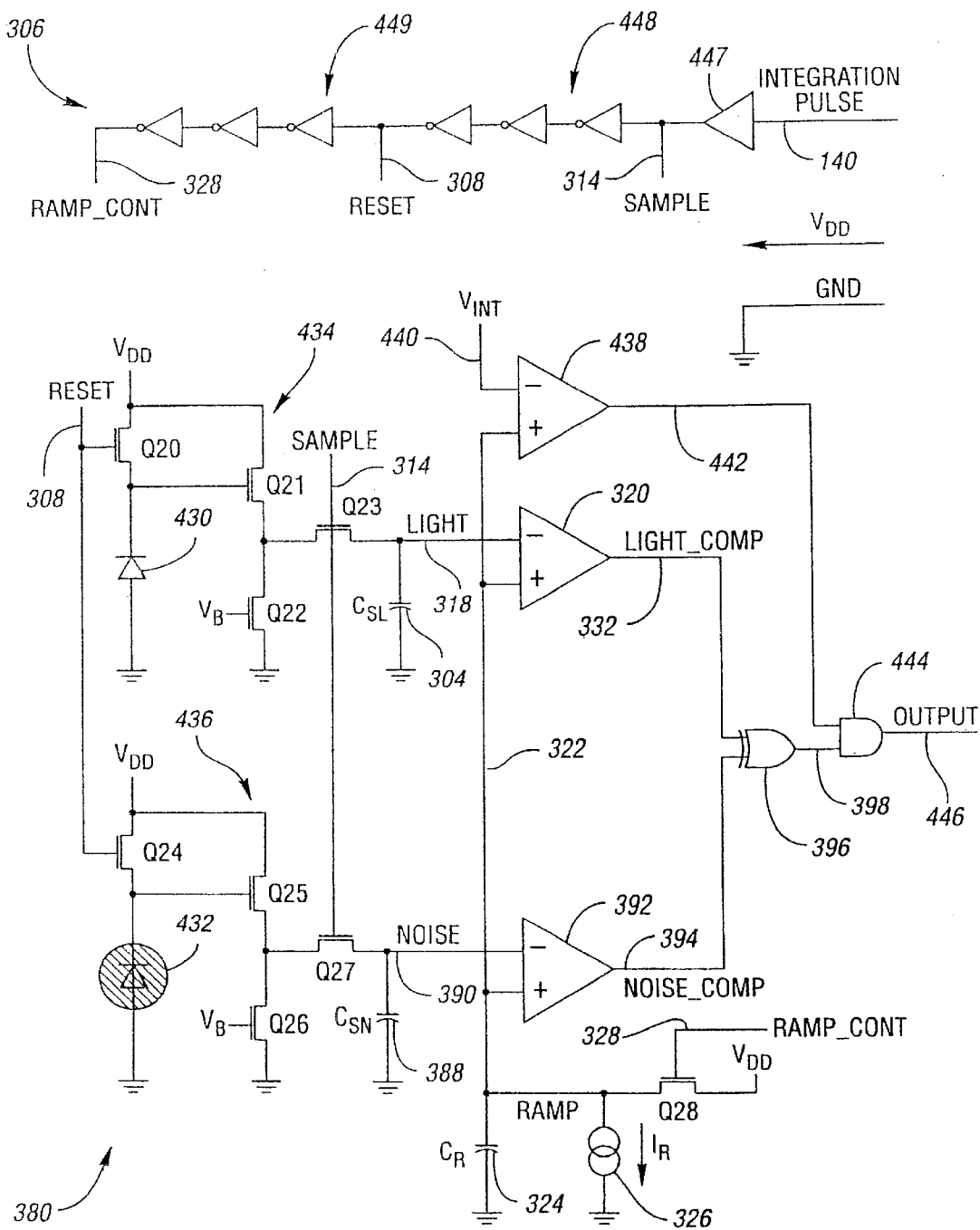
FIG. 14 is a schematic diagram of an implementation of the light sensor of FIG. 12 using photodiodes as light transducers.

Referring now to FIG. 14, a schematic diagram of an implementation of the light sensor of FIG. 12 using photodiodes as light transducers is shown. Light-to-pulse circuit 380 is implemented using exposed photodiode 430 for exposed light transducer 106 and shielded photodiode 432 for shielded light transducer 144. The anode of exposed photodiode 430 is connected to ground and the cathode connected through transistor Q20 to $V_{DD}$. The base of transistor Q20 is controlled by reset signal 308. Hence, transistor Q20 functions as switch 310. Transistors Q21 and Q22 are connected in series between $V_{DD}$ and ground to form a buffer, shown generally by 434. The base of transistor Q21 is connected to the collector of exposed photodiode 430. The base of load transistor Q22 is connected to fixed voltage $V_B$. The output of buffer 434 is connected through transistor Q23 to light storage capacitor 304. The base of transistor Q23 is driven by sample signal 314, permitting transistor Q23 to function as switch 316. The anode of shielded photodiode 432 is connected to ground and the cathode is connected to $V_{DD}$ through transistor Q24. The base of transistor Q24 is driven by reset signal 308 permitting transistor Q24 to function as switch 382. Transistors Q25 and Q26 form a buffer, shown generally by 436, isolating the output from shielded photodiode 432 in the same manner that buffer 434 isolates exposed photodiode 430. Transistor Q27 connects the output of buffer 436 to noise storage capacitor 388. The base of transistor Q27 is driven by sample signal 314 permitting transistor Q27 to function as switch 386. Typically, light storage capacitor 304 and noise storage capacitor 388 are 2 pF. Ramp capacitor 324, typically 10 pF, is charged to $V_{DD}$ through transistor Q28. The base of transistor Q28 is driven by ramp control signal 328 permitting transistor Q28 to function as switch 330. Ramp capacitor 324 is discharged through current source 326 at an approximately constant current $I_R$ of 0.1 μA when transistor Q28 is off.

Sensor power-up response is improved and the effective dynamic range extended by including circuitry to inhibit output if ramp voltage 322 drops beneath a preset voltage. Light-to-pulse circuit 380 includes comparator 438 comparing ramp voltage 322 with initialization voltage (VINIT) 440. Comparator output 442 is ANDed with exclusive-OR output 396 by AND gate 444 to produce AND gate output 446. During operation, if ramp voltage 322 is less than initialization voltage 440, output 446 is deasserted. The use of comparator 438 and AND gate 444 guarantees that output 446 is not asserted regardless of the state of light-to-pulse circuit 380 following power-up. In a preferred embodiment, the initialization voltage is 0.45 V.

Sensor logic 306 generates control signals 308, 314, 328 based on integration pulse 140 which may be generated internally or provided from an external source. Buffer 447 receives integration pulse 140 and produces sample control 314. An odd number of sequentially connected inverters, shown generally as inverter train 448, accepts sample control 314 and produces reset control 308. A second set of odd numbered sequentially connected inverters, shown generally as inverter train 449, accepts reset signal 308 and produces ramp control signal 328. The circuit shown in FIG. 14 has a resolution of at least 8 bits and a sensitivity of approximately 1 volt per lux-second. The maximum output pulse duration 420 is independent of integration period 346 provided by the duration of integration pulse 140.

Figure 15:
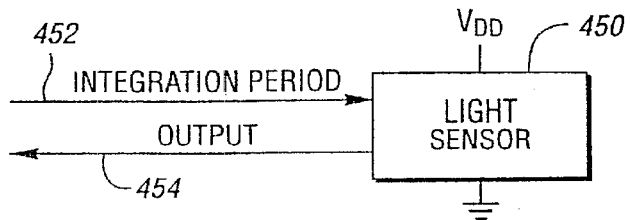
FIGS. 15–18 are block diagrams of various embodiments for light sensor packaging, output, and control.
Figure 16:
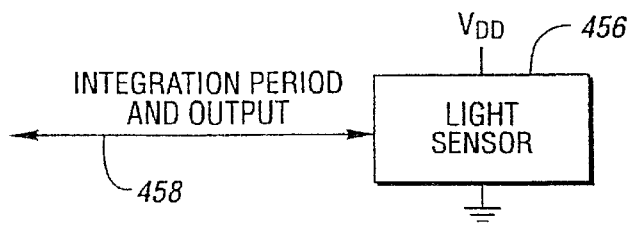
Figure 17:
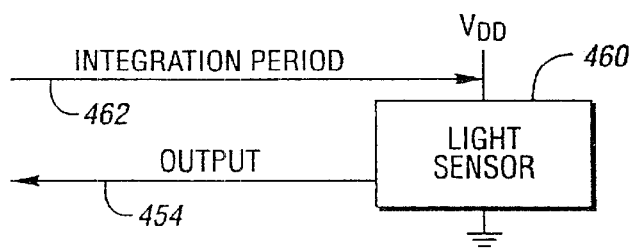
Figure 18:
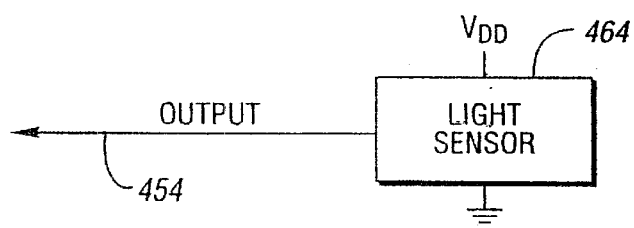

Referring now to FIGS. 15–18, various embodiments for light sensor packaging, output, and control are shown. Each embodiment may include light-to-pulse circuitry as described with regard to FIGS. 10–14 above. In FIG. 15, light sensor package 450 accepts four pins for supply voltage $V_{DD}$, ground, integration period signal 452, and output signal 454. Integration period signal 452 may be integration pulse 140 used by light-to-pulse circuit 380 to produce output CUR 398 which is sent as output signal 454. In FIG. 16, light sensor package 456 requires only three pins for $V_{DD}$, ground, and combined integration period and output signal 458. Combined signal 458 may be interconnect signal 114 as described with regard to FIGS. 4 and 5 above. In FIG. 17, light sensor package 460 admits three pins for output signal 454, ground, and combined $V_{DD}$ and integration period signal 462. As is known in the art, combined signal 462 may be separated into power supply voltage $V_{DD}$ and integration period signal 452 through the use of filters. In FIG. 18, light sensor package 464 admits three pins for $V_{DD}$, ground, and output signal 454. Integration period signal 452 is generated within light sensor package 464 as described with regard to FIG. 19 below.

Figure 19:
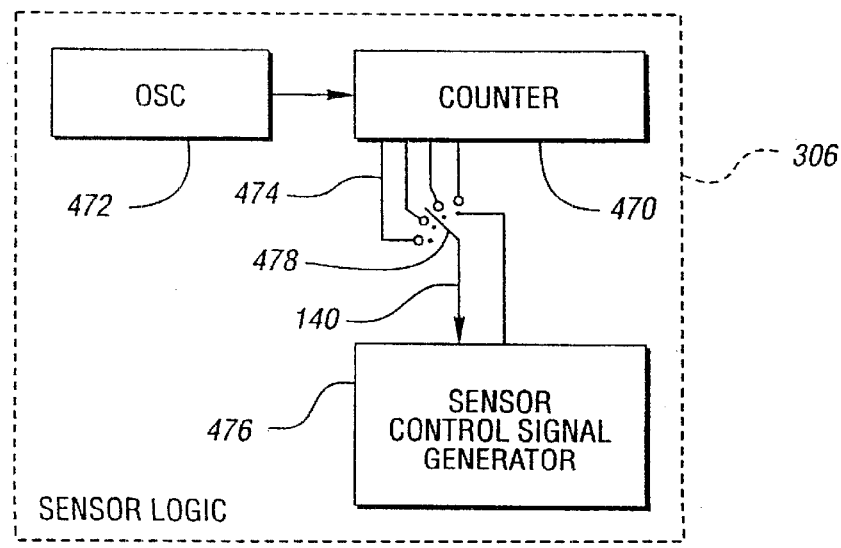
FIG. 19 is a block diagram of sensor logic for internally determining the integration period signal.

Referring now to FIG. 19, a block diagram of sensor logic for internally determining the integration period signal is shown. Sensor logic 306 may include free-running counter 470 driven by internal oscillator 472. Counter 470 may have taps, one of which is indicated by 474, connected to different counter bits. For example, one tap 474 may be connected to the to bit, the next tap 474 to the $n^{th}$+2 bit, the next tap 474 connected to the $n^{th}$+4 bit, and so on, with each successive tap thereby providing a pulse with a period four times longer than the preceding tap 474. Sensor control signal generator 476 controls switch 478 to determine which tap 474 will be used to produce integration pulse 140. Typically, sensor control signal generator 476 sequences through each tap 474 repeatedly. Sensor control signal generator 476 then uses integration pulse 140 to generate control signals such as reset signal 308, sample signal 314, and ramp control signal 328 as described with regards to FIG. 14 above.

Figure 20:
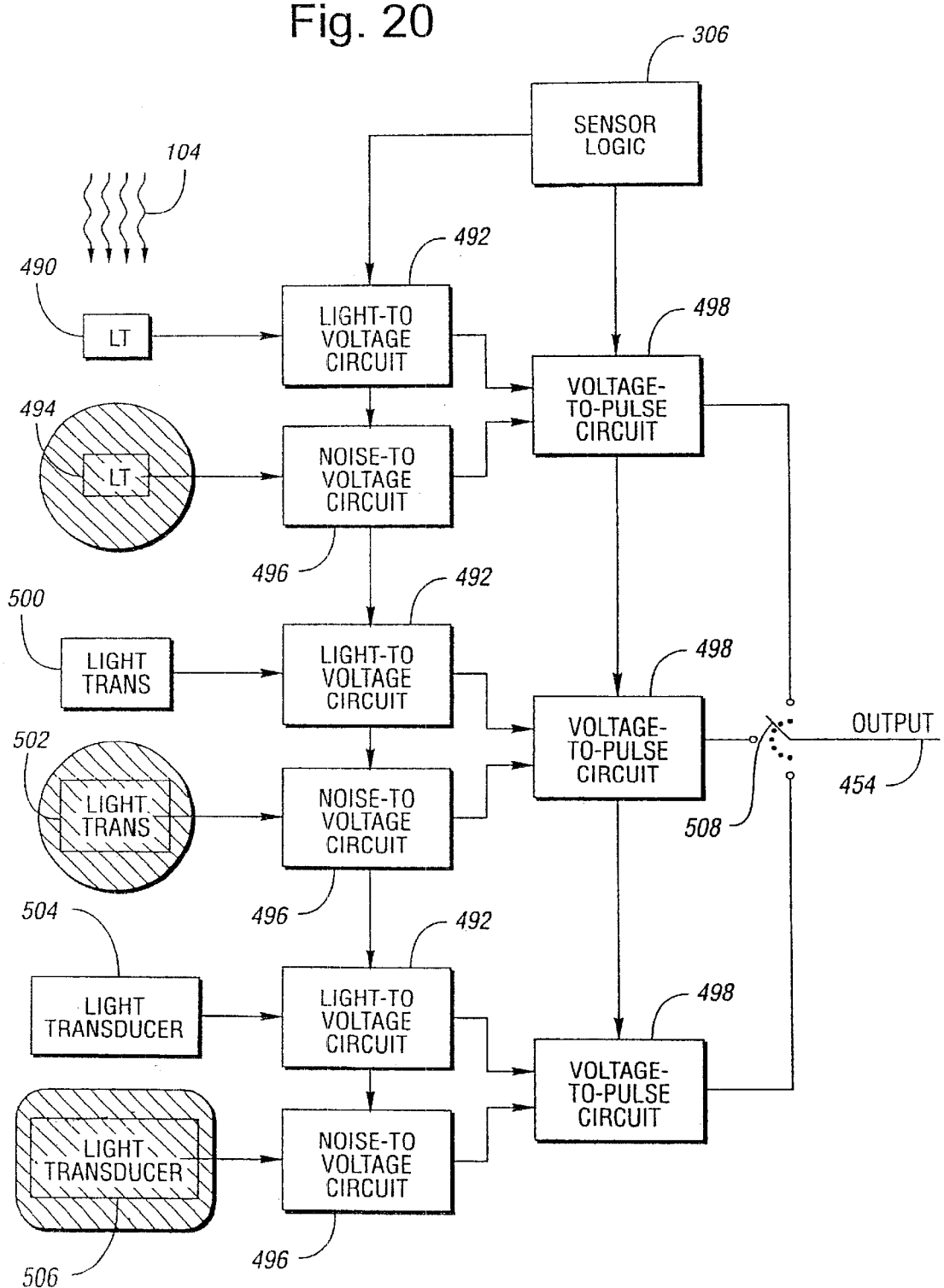
FIG. 20 is a block diagram illustrating the use of light transducers having different effective areas to achieve increased dynamic range according to an embodiment of the present invention.

Referring now to FIG. 20, a block diagram illustrating the use of light transducers having different effective areas to achieve increased dynamic range is shown. As an alternative to or together with varying the integration time, pairs of exposed light transducer 106 and shielded light transducer 144 having different effective areas may be used. If photodiodes 430, 432 are used as light transducers 106, 144, the effective area is the photodiode collector area. Small exposed light transducer 490 produces charge which is converted to a voltage by light-to-voltage circuit 492. Light-to-voltage circuit 492 may be implemented using switches 310, 316, and light storage capacitor 304 as described with regard to FIG. 12 above. Charge produced by small shielded light transducer 494 is converted to voltage by noise-to-voltage circuit 496. Noise-to-voltage circuit 496 may be implemented using switches 382, 386 and noise storage capacitor 388 as described with regard to FIG. 12 above. The outputs of light-to-voltage circuit 492 and noise-to-voltage circuit 496 are converted to a pulse with a width based on charge accumulated by small exposed light transducer 490 less charge due to noise integrated by small shielded light transducer 494 over an integration period by voltage-to-pulse circuit 498. Voltage-to-pulse circuit 498 may be implemented using comparators 320, 392, capacitor 324, current source 326, and gate 396 as described with regard to FIG. 12 above. Medium exposed light transducer 500 has an effective area larger than the effective area for small exposed light transducer 490, resulting in increased sensitivity. For example, if the effective area of medium exposed light transducer 500 is four times larger than the effective area of small exposed light transducer 490, medium exposed light transducer 500 will be four times more sensitive to light 104 than will be small exposed light transducer 490. Medium shielded light transducer 502 has an effective area the same as medium exposed light transducer 500. Additional light-to-voltage circuit 492, noise-to-voltage circuit 496, and voltage-to-pulse circuit 498 produce a noise-corrected output pulse with a width based on light 104 incident on medium exposed light transducer 500. Similarly, large exposed light transducer 504 and large shielded light transducer 506 provide still increased sensitivity over medium exposed light transducer 500 and medium shielded light transducer 502 by having a still greater effective area.

Switch 508 under the control of sensor logic 306 sets which output from voltage-to-pulse circuits 498 will be used for output signal 454. Output signal 454 may be selected based on a signal generated within sensor logic 306 or may be based on a signal provided from outside of sensor logic 306.

In an alternative embodiment, only one shielded light transducer 144 is used. The output of shielded light transducer 144 is scaled prior to each noise-to-voltage circuit 496 in proportion to the varying effective areas of exposed light transducers 106. It will be recognized by one of ordinary skill in the art that, though the example shown in FIG. 20 has three pairs of exposed light transducer 106 and shielded light transducer 144, any number of pairs may be used.

Figure 21:
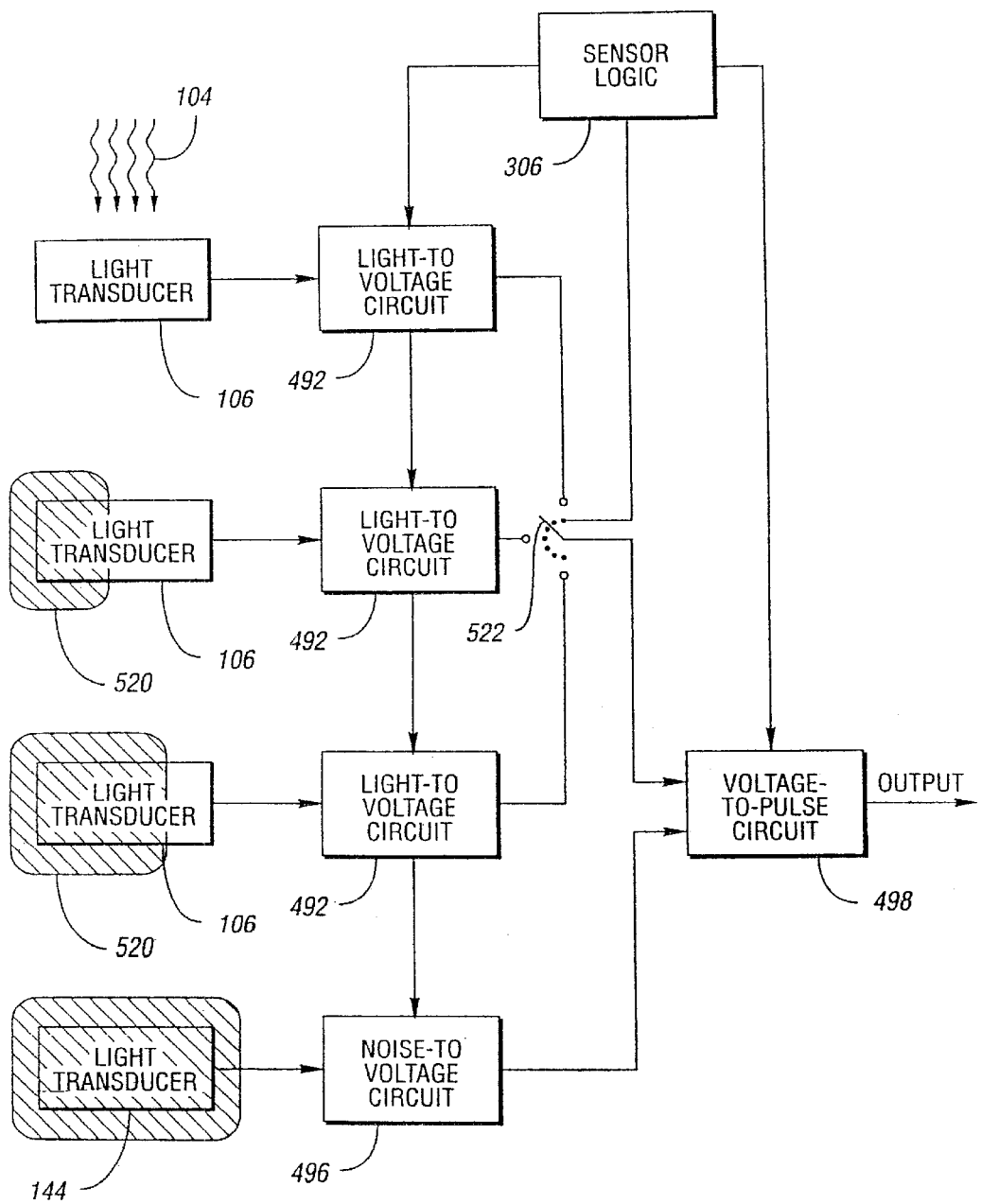
FIG. 21 is a block diagram illustrating the use of light transducers having different apertures to achieve increased dynamic range according to an embodiment of the present invention.

Referring now to FIG. 21, a block diagram illustrating the use of light transducers having different apertures to achieve increased dynamic range is shown. As an alternative to or together with specifying the integration period, exposed light transducers 106 having the same effective area may each have a different aperture admitting area for admitting light 104. Varying apertures may be produced using partial shield 520 blocking light 104 from reaching a portion of exposed light transducer 106. Each exposed light transducer 106 produces charge converted to a voltage by a corresponding light-to-voltage circuit 492. Switch 522 under the control of sensor logic 306 selects which output of light-to-voltage circuits 492 to forward to voltage-to-pulse circuit 498. Voltage-to-pulse circuit 498 produces output signal 454 compensated for noise sensed by shielded light transducer 144 and processed by noise-to-voltage circuit 496. Sensor logic 306 may select output of light-to-voltage circuits 492 based on an internally generated control signal or on a control signal received from outside of sensor logic 306.

Figure 22:
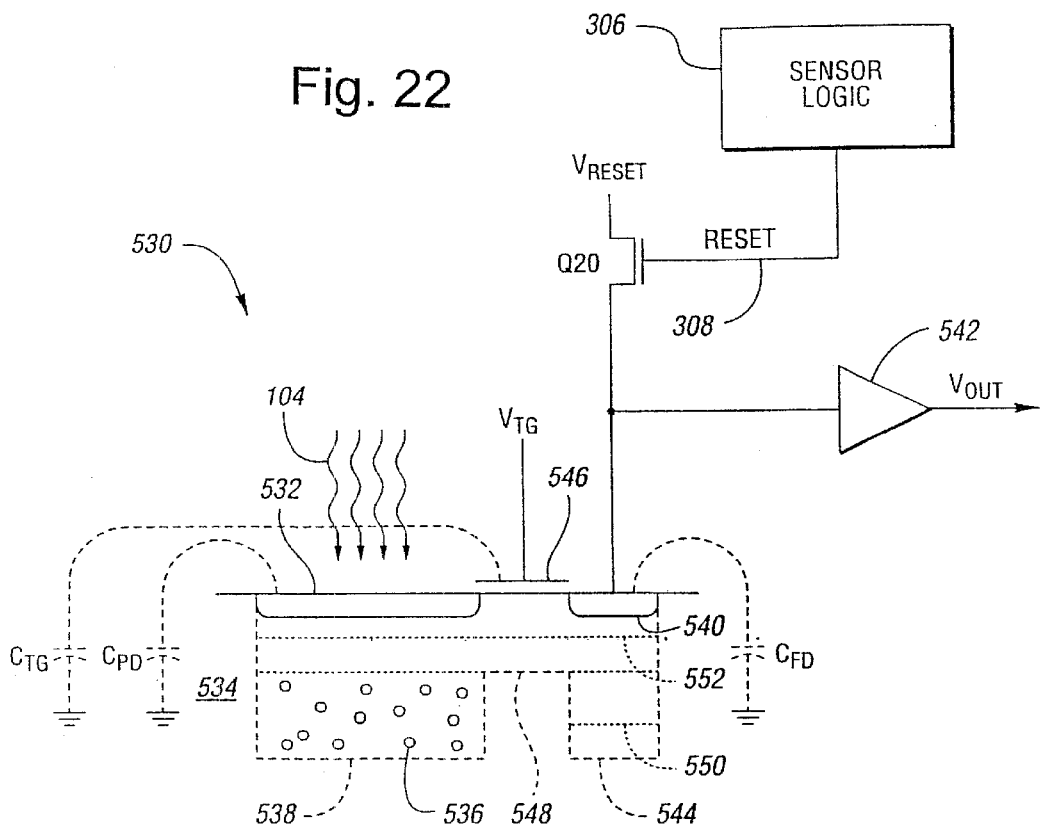
FIG. 22 is a schematic diagram illustrating different transducer capacitances for different amounts of light-induced charge to achieve increased dynamic range according to an embodiment of the present invention.

Referring now to FIG. 22, a schematic diagram illustrating different transducer capacitances for different amounts of light-induced charge to achieve increased dynamic range is shown. A photodiode, shown generally by 530, is formed by n-type diffusion 532 in p-type substrate 534. Light 104 incident on photodiode 530 generates charge 536 which may be accumulated in photodiode well 538 beneath n-type diffusion 532. Photodiode 530 has intrinsic photodiode capacitance $C_{PD}$. Floating diffusion 540 is also formed by diffusing n-type material in substrate 534. Floating diffusion 540 is connected through transistor Q20 to reset voltage $V_{RESET}$. The gate of transistor Q20 is connected to reset signal 308 under the control of sensor logic 306. Floating diffusion 540 is also connected to the input of buffer 542. The output of buffer 542 is transducer output $V_{OUT}$. Floating diffusion 540 defines diffusion well 544 formed in a region of substrate 534 when reset signal 308 is asserted. Floating diffusion 540 has an intrinsic floating diffusion capacitance $C_{FD}$. Transmission gate 546 is positioned between diffusion 532 and floating diffusion 540. Transmission gate 546 is held at voltage $V_{TG}$ to form transmission well 548 thereunder. Transmission well 548 has a depth shallower than photodiode well 538 and diffusion well 544. Transmission gate 546 has an intrinsic transmission gate capacitance $C_{TG}$.

When reset signal 308 is asserted, bringing floating diffusion 540 to $V_{RESET}$, charge is eliminated in diffusion well 544. Further, when charge is reset in diffusion well 544, any charge 536 in photodiode well 538 above the depth of transmission well 548 flows through transmission well 548, through floating diffusion 540, and is eliminated. During a light integration period, reset signal 308 is unasserted, causing the voltage of floating diffusion 540 to float based on the amount of charge 536 in diffusion well 544. As light 104 strikes diffusion 532, charge 536 is created. Since charge 536 in photodiode well 538 up to the level of transmission well 548 was not eliminated by charge reset, additional charge 536 produced by incident light 104 flows from photodiode well 538 through transmission well 548 and into diffusion well 544. At charge level 550, beneath the level of transmission well 548, only diffusion well 544 is filling with charge 536. Hence, the voltage of floating diffusion 540 is inversely proportional to floating gate capacitance $C_{FD}$. When enough charge 536 has been generated to fill diffusion well 544 above the level of transmission well 548 such as, for example level 552, diffusion well 544, transmission well 548, and photodiode well 538 all fill with charge 536. Hence, the voltage of floating diffusion 540 is now inversely proportional to the sum of floating diffusion capacitance $C_{FD}$, transmission gate capacitance $C_{TG}$, and photodiode capacitance $C_{PD}$.

Figure 23:
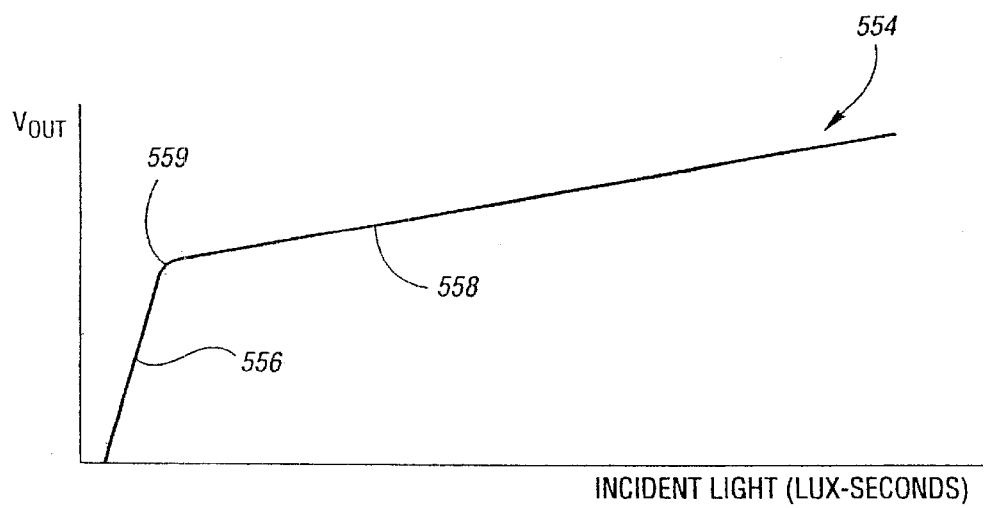
FIG. 23 is a graph of the output potential as a function of accumulated incident light for the transducer of FIG. 22.

Referring now to FIG. 23, a graph of output potential as a function of accumulated incident light for the transducer of FIG. 22 is shown. A curve, shown generally by 554, shows transducer output $V_{OUT}$ as a function of light 104 incident on diffusion 532 and, possibly, floating diffusion 540 over the integration period. During steep portion 556, charge 536 is accumulating in diffusion well 544 alone. Since the conversion gain is based only on floating diffusion capacitance $C_{FD}$, photodiode 530 appears to have a high sensitivity to incident light 104. During shallow portion 558, charge 536 is accumulated in diffusion well 544, transmission well 548, and photodiode well 538. Since the conversion gain is now dependent on the parallel combination of capacitances $C_{FD}$, $C_{TG}$, and $C_{PD}$, photodiode 530 now appears less sensitive to incident light 104. By adjusting voltages $V_{RESET}$ and $V_{TG}$, knee point 559 between steep portion 556 and shallow portion 558 can be shifted affecting the dynamic range. For example, if the maximum voltage swing for floating diffusion 540 is 1 volt; the ratio of $C_{FD}$ to the sum of $C_{FD}$, $C_{TG}$, and $C_{PD}$ is 1:100; and knee point 559 is set at 0.5 volts, the dynamic range of photodiode 530 is increased about 50 times over the dynamic range of a similar photodiode without dual capacitance.

Figure 24:
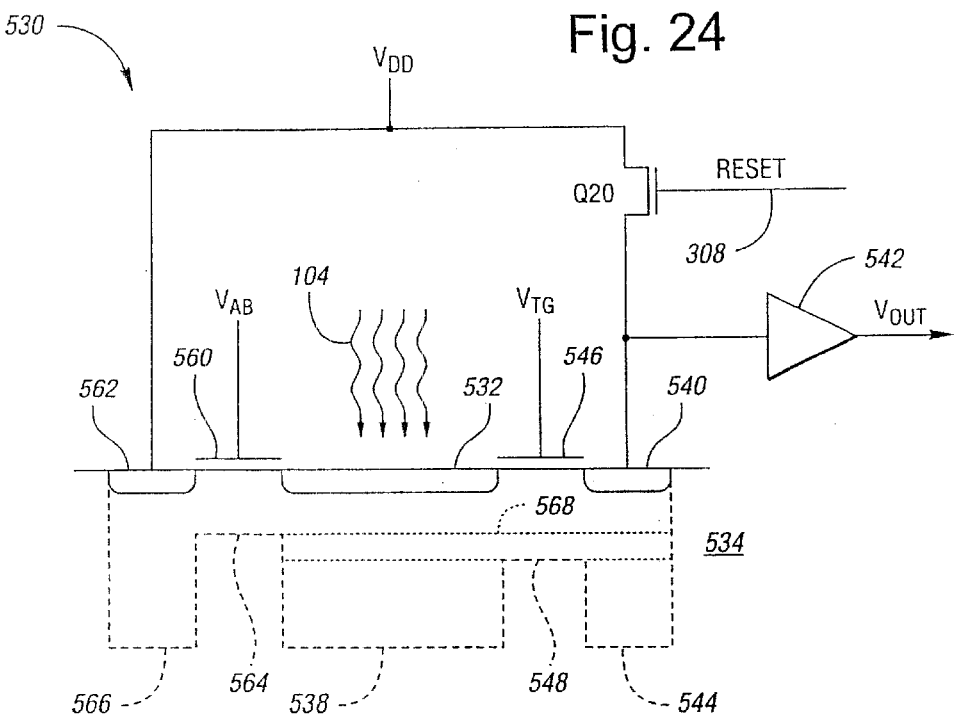
FIG. 24 is a schematic diagram illustrating a photodiode transducer incorporating an anti-bloom gate according to an embodiment of the present invention.

Referring now to FIG. 24, a schematic diagram illustrating a photodiode transducer incorporating an anti-bloom gate according to an embodiment of the present invention is shown. Anti-bloom gate 560 is formed between diffusion 532 and source voltage diffusion 562 tied to $V_{DD}$. Anti-bloom gate 560 is tied to anti-bloom voltage $V_{AB}$. Anti-bloom gate 560 forms anti-bloom well 564 in substrate 534 between photodiode well 538 and source diffusion well 566. Anti-bloom voltage $V_{AB}$ is less than transmission gate voltage $V_{TG}$ well 564, making anti-bloom well 564 shallower than transmission well 548. When accumulated charge generated by photodiode 530 exceeds charge level 568 equal to the depth of anti-bloom well 564, the excess charge flows beneath anti-bloom gate 560 into source voltage diffusion 562 and is eliminated. Anti-bloom gate 560 prevents output voltage $V_{OUT}$ from dropping below a level detectable by comparator 320 in light-to-pulse circuit 380.

Figure 25:
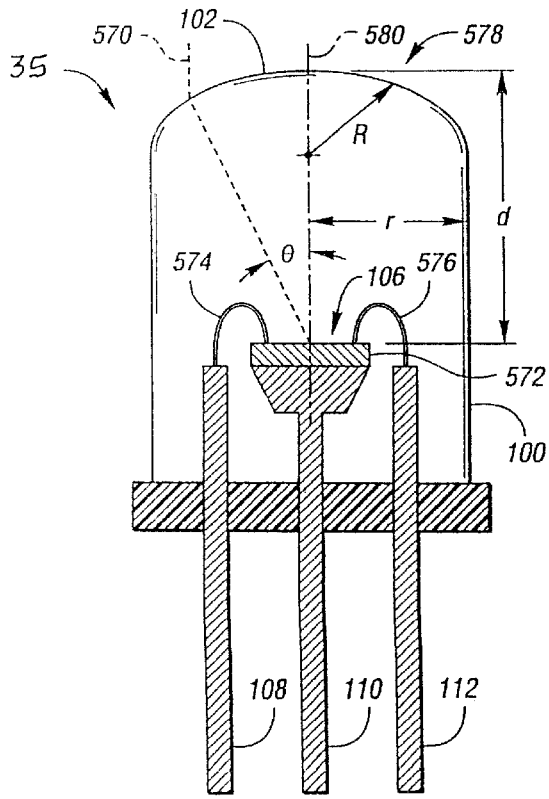
FIG. 25 is a drawing illustrating an enclosure for a light sensor according to an embodiment of the present invention.

Referring now to FIG. 25, a drawing illustrating enclosure for a light sensor according to an embodiment of the present invention is shown. Light sensor 35 includes enclosure 100 having window 102 for admitting light, one ray of which is indicated by 570. Enclosure 100 admits power pin 108, ground pin 110, and signal pin 112. Semiconductor die 572, encapsulated within enclosure 100, incorporates light transducers 106, 144 and associated electronics as described with regards to FIGS. 6–7 and 10–24 above. Pins 108, 110, 112 may be wire bonded to die 527, as shown by wire 574 for power pin 108 and wire 576 for signal pin 112, or may be directly bonded to die 527, as shown for ground pin 110.

Preferably, enclosure 100 is the same type used to construct three-terminal light emitting Up diodes (LEDs). A preferred format is commonly referred to as the T-1¾ or 5 mm package. Encapsulating electronics in such packages is well known in the art of optical electronics manufacturing.

A lens, shown generally by 578, is preferably used to focus light onto exposed light transducer 106. Lens 578 may be placed in front of light sensor 35 or, preferably, may be incorporated into window 102 as shown in FIG. 25. Lens 578 defines the field of view of light sensor 35 and provides improved sensitivity through optical gain.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

The invention claimed is:

1. A system for detecting moisture on a surface comprising:
   a light emitter for directing light at the surface;
   a light sensor for receiving light that is emitted from the light emitter and strikes the surface, wherein the light sensor accumulates charge in response to incident light over a preselected integration period; and
   a control circuit coupled to the light sensor for detecting moisture on the surface based on the intensity of light received by the light sensor.

2. The system of claim 1, wherein the preselected integration period is variable.

3. The system of claim 1, wherein the light sensor comprises:
   a light transducer exposed to light operative to accumulate charge in proportion to light incident over the integration period; and
   a sensor logic in communication with the exposed light transducer, the sensor logic operative to
     (a) determine the light integration period prior to beginning integration,
     (b) reset the charge accumulated in the exposed light transducer at the beginning of the determined light integration period,
     (c) measure the charge accumulated by the exposed light transducer over the determined light integration period, and
     (d) output a pulse having a width based on the measured accumulated exposed light transducer charge.

4. The system of claim 3, wherein the light sensor further comprises a comparator with one input connected to the exposed light transducer and the other input connected to a switched capacitor circuit, the switched capacitor circuit operative to charge a capacitor to a fixed voltage when the switch is closed and to discharge the capacitor at a constant rate when the switch is open, wherein the sensor logic is further operative to close the switch during the determined light integration period and open the switch after the determined light integration period, thereby creating the pulse at the comparator output.

5. The system of claim 4, wherein the light sensor further comprises a second comparator with one input connected to a fixed voltage and the other input connected to the switched capacitor circuit, the second comparator output operative to inhibit output of the determined pulse if the ramp voltage is less than the fixed voltage.

6. The system of claim 3, wherein the light sensor further comprises a light transducer shielded from ambient light, the shielded light transducer having the same construction as the exposed light transducer, the shielded light transducer operative to accumulate charge in proportion to noise over the integration period, wherein the sensor logic is further operative to:
   reset the charge accumulated in the shielded light transducer at the beginning of the determined light integration period;
   measure the charge accumulated by the shielded light transducer over the determined light integration period; and
   output a pulse having a width based on the difference between the measured accumulated exposed light transducer charge and the measured accumulated shielded light transducer charge.

7. The system of claim 6, wherein the light sensor is further operative to:
   receive an integration pulse, the width of the integration pulse determining the integration period; and
   generate the output pulse after the integration pulse, the difference in time between the end of the integration pulse and the start of the output pulse indicative of the amount of thermal noise in the light sensor.

8. The system of claim 1, wherein the light sensor comprises:
   an enclosure having a window for receiving light, the enclosure admitting a power pin, a ground pin, and a signal pin;
   an exposed light transducer disposed within the enclosure, the exposed light transducer operative to accumulate charge in proportion to light received through the window incident on the exposed light transducer;
   a light-to-pulse circuit disposed within the enclosure and in communication with the exposed light transducer, the power pin, and the ground pin, the light-to-pulse circuit operative to output an output pulse, the output pulse width based on charge accumulated by the exposed light transducer over an integration period; and
   a sensor logic disposed within the enclosure, the sensor logic in communication with the light-to-pulse circuit, the power pin, the ground pin, and the signal pin, the sensor logic operative to
     (a) receive an integration pulse on the signal pin,
     (b) determine the integration period based on the width of the integration pulse, and
     (c) output the output pulse on the signal pin.

9. The system of claim 1, wherein the light emitter emits light in the infrared range.

10. A method for detecting moisture on a surface based on the intensity of light received by a light sensor from a light emitter directed at the surface, the method comprising the step of configuring the light sensor to accumulate charge in response to incident light over a preselected integration period.

11. The method of claim 10, wherein the preselected integration period is variable.

* * * * *